(12) United States Patent
Yanagisawa et al.

(10) Patent No.: US 6,281,619 B1
(45) Date of Patent: Aug. 28, 2001

(54) VIBRATION GYRO

(75) Inventors: Tohru Yanagisawa; Izumi Yamamoto, both of Saitama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/074,691

(22) Filed: May 8, 1998

(30) Foreign Application Priority Data

May 9, 1997 (JP) .................................................. 9-119218
Jun. 4, 1997 (JP) .................................................. 9-146415

(51) Int. Cl.$^7$ ............................. G01C 19/56; H01L 41/04
(52) U.S. Cl. .................... 310/370; 310/311; 310/360; 310/366; 310/367
(58) Field of Search .................................. 310/318, 370, 310/328, 311, 360, 365–367

(56) References Cited

U.S. PATENT DOCUMENTS

| | | | |
|---|---|---|---|
| Re. 34,006 | 7/1992 | Cage et al. | 73/505 |
| 3,127,775 | 4/1964 | Hansen et al. | 73/505 |
| 4,007,432 * | 2/1977 | Nakamura | 310/370 |
| 4,802,364 | 2/1989 | Cage et al. | 73/505 |
| 4,930,351 * | 6/1990 | Macy et al. | 73/505 |
| 5,135,312 * | 8/1992 | Blake | 310/333 |
| 5,166,571 | 11/1992 | Konno et al. | 310/333 |
| 5,193,391 | 3/1993 | Cage | 73/505 |
| 5,331,242 * | 7/1994 | Petri | 310/370 |
| 5,420,548 * | 5/1995 | Nakajima | 310/370 |
| 5,585,562 * | 12/1996 | Kurata et al. | 73/504.16 |
| 5,597,955 * | 1/1997 | Leger et al. | 310/333 |
| 5,723,790 * | 3/1998 | Andersson | 73/514.36 |
| 5,757,107 * | 5/1998 | Wakatuki et al. | 310/370 |
| 5,763,781 * | 6/1998 | Netzer | 73/504.16 |
| 5,824,900 * | 10/1998 | Konno et al. | 310/370 |

FOREIGN PATENT DOCUMENTS

| | | | |
|---|---|---|---|
| 0318972 | 6/1989 | (EP) | G01C/19/56 |
| 0442280 | 8/1991 | (EP) | G01C/19/56 |
| 53-146585 * | 12/1978 | (JP) | 310/370 |
| 6258083 | 9/1994 | (JP) | G01C/19/56 |
| 1054724 | 2/1998 | (JP) | G01C/19/56 |

* cited by examiner

*Primary Examiner*—Thomas M. Dougherty

(57) ABSTRACT

A four-beam tuning fork is provided in which the base part thereof is stationary regardless of the vibration of the resonator, the same vibration mode being used for both excitation and detection, and the outputs from a plurality of beams are used to cancel the noise output caused by externally applied vibration

32 Claims, 18 Drawing Sheets

(A)

(B)

(A)

(B)

(A)

(B)

VIBRATION GYRO

BACKGROUND OF THE INVENTION

1. Field of the Invention

The present invention relates to a vibration gyroscope that detects angular velocity.

2. Description of Related Art

Rotating gyroscopes of the mechanical type have been used in the past as inertial navigation apparatuses for aircraft and vessels, but their large size and high cost make them difficult to build into small electronic equipment and small transport equipment.

In recent years, however, research with regard to making compact gyroscopes has progressed, and progress has been made in the area of a practically usable vibrating gyroscope in which a piezo-electric element resonator is caused to vibrate, another piezo-electric element resonator mounted thereonto rotating, the vibration caused by the resulting Coriolis force being used to detect the voltage that is generated. This is used in car navigation systems and in shake-detection apparatuses for video cameras.

A gyroscope of the past which uses a piezo-electric element will be described below.

FIG. 13 is a perspective view of a tuning fork type of vibrating gyro of the past.

A tuning fork type of vibrating gyro of the past will be described with reference being made to FIG. 13. The resonator 71 is made of a constant-resiliency metal such as "Elinvar" and has the structure of a compound tuning fork.

That is, the resonator 71 has joined onto the top part of the first beams 72 and 73 the second beams 74 and 75. The piezo-electric element driving section and drive electrode 76 are attached to the first beam 73.

While it is not shown in the drawing, in the same manner another piezo-electric element driving section and drive electrode are attached to the first beam 72.

The piezo-electric element detector and detection electrode 77 are attached to the second beam 75 and in the same type of detection section and detection electrode are attached to the second beam 74. In this structure, the direction in which a beam extends is taken as the Z-axis direction.

Next, the action of this structure will be described.

As a result of an AC voltage that is applied to the drive electrode 76, the first beams 72 and 73 exhibit a first bending vibration which displaces them to the left and to the right. In the description which follows, this will be called "intraplane vibration," since it is normally customary to consider the vibration of a tuning fork in a single plane to be the ideal case.

In response to this intraplane vibration, the second beams 74 and 75 that are joined to the first beams 72 and 73 exhibit intraplane vibration.

If the overall tuning fork is caused to rotate about the Z axis at an angular velocity of ω, a Coriolis force Fc acts in a direction that is perpendicular to the intraplane vibration. This Coriolis force Fc can be expressed by the following equation.

$$Fc = 2 \cdot M \cdot \omega \cdot V$$

In the above equation, M is the mass of the first beams 72 and 73 or of the second beams 74 and 75 and V is the velocity of the vibration. In accordance with the Coriolis Fc, a second bending vibration is excited which has displacement in directions that are perpendicular to the intraplane vibration.

This will be called extraplanar vibration.

By detecting the AC voltage that is generated by this extraplanar vibration using the detection electrode 77 or 79, it is possible to calculate and know the angular velocity ω.

However, a vibrating gyro of the past had the following problem. When supporting a resonator, to minimize the influence of the support on the resonator, the support is generally made at a position of the resonator that does not move during vibration, which is at a vibration node.

In the tuning fork configuration which is shown in FIG. 13, the node of the intraplanar vibration is at the base part and while there is almost no movement in this area, in the case of extraplanar vibration which is excited by Coriolis force, there is no part that does not move in accordance with the vibration. Therefore, regardless of the method of support, the support will influence the resonator.

In general a tuning fork type of resonator is supported in the middle of the base part, and whereas the cases of supporting in this part and not supporting in this part, there is almost no change in the resonant frequency for the intraplanar vibration, in the case of extraplanar vibration the resonant frequency is changed by several percent.

Therefore, the extraplanar vibration will change several percent in accordance with the type of support used. In this case, the alternating Coriolis force that has the intraplanar vibration resonant frequency excites extraplanar vibration, but the excitation efficiency exhibits dependency upon the extraplanar vibration resonant frequency.

If there is distance between the intraplanar vibration resonant frequency and the extraplanar vibration resonant frequency, it is not possible to achieve sufficient excitation of extraplanar vibration, and a small change in the support can make a large change in the extraplanar vibration resonant frequency, so that the excitation efficiency greatly changes, making detection with good accuracy impossible. For this reason, tuning fork type vibrating gyros did not enjoy sufficiently wide use.

At present, there have been proposed various vibrating gyros having configurations such as a tuning fork configuration or a single-beam configuration, and because a vibrating gyro detects a Coriolis force that acts in a direction that is perpendicular to the vibration direction, it is thought to be advantageous to have a configuration that has symmetry about the center within a plane that is perpendicular to the rotational direction that is to be detected, and at present the single-beam configuration is the chiefly used configuration.

However, the support of a single-beam configuration is difficult, it is difficult to achieve support that does not influence the resonator, and it is not possible to completely prevent leakage of vibration to the outside.

Examples of easy support that has been envisioned long ago are the four-beam tuning fork or the multi-beam tuning fork.

For example, in the Japanese Unexamined Patent Publication (KOKAI)No. 6-258083 there is disclosure of four-beam tuning fork vibrating gyro.

This four-beam tuning fork has a configuration having symmetry about the center within a plane that is perpendicular to the rotational direction that is to be detected, the same as with a single-beam configuration, and additionally, as a characteristic of the tuning fork configuration, because the bottom surface of the base part does not vibrate, it is possible to achieve complete vibrational isolation with the outside.

The four-beam vibrating gyro which is disclosed in the Japanese Unexamined Patent Publication (KOKAI)No. 6-258083 can be used to implement a vibrating gyro with almost no vibration of the base part, by selecting vibrational modes for which the directions of drive and Coriolis force detection are perpendicular from the six existing first-order vibration modes of the four-beam tuning fork and by using first order coupling thereof to detect Coriolis force.

The six first-order vibration modes of a four-beam tuning fork with good symmetry will now be described with reference to relevant accompanying drawings.

FIG. 21 is a front elevation view of a general type of four-beam tuning fork, in which the condition of the bottom surface of the base thereof being semi-fixed is indicated by hatching.

The sizes of various parts of this four-beam tuning fork are: overall length 4.8 mm, base length 1.92 mm, beam length 2.88 mm, base width 1.2 mm, beam width 0.48 mm, and groove 0.24 mm.

FIG. 22 through FIG. 27 are cross-sectional views of the beams as seen from the ends of the beams of the four-beam tuning fork, the six first-order vibration modes that each of the beams of this four-beam tuning fork having been calculated using the finite element method, verified by experiment, and indicated in sequence of increasing frequency.

Note, however, that the last torsion mode could not be verified by experiment.

FIG. 28 through FIG. 33 are cross-sectional view of the beams as seen from the ends of the beams of the same type of four-beam tuning fork, with a 1% reduction in the overall width of the tuning fork, but with no change in the thickness.

In contrast to FIG. 22 through FIG. 27, the cross-section of the beam is a non-square rectangle, and the six first-order vibration modes of each of the beams of this four-beam tuning fork as well were calculated using the finite element method, verified by experiment, and indicated in sequence of increasing frequency. In this case as well, it was not possible to verify the least torsion mode by experiment.

First, using FIG. 22 through FIG. 27, the vibration mode for the case in which the cross-section of the beams is a square will be described.

In FIG. 22, the arrows indicated in the drawing indicate the displacement direction of the beams at some given instant in time, and the vibration mode with these displacement directions will be called vibration mode 1, in which the centers of each of the beams are displaced so that their paths form a non-square rectangle, the characteristic vibration frequency thereof being 38.730 kHz.

In FIG. 23, the arrows in the drawing indicate the displacement direction of the beams at some given instant in time, and the vibration mode with these displacement directions will be called vibration mode 2, in which the paths of the centers of the four beams are displaced while maintaining a square shape, the characteristic vibration frequency thereof being 38.841 kHz.

In FIG. 24, the arrows indicate the displacement direction of the beams at some given instant in time, and this vibration mode will be called vibration mode 3, in which the paths of the centers of the four beams are displaced so as to form a diamond shape, the characteristic vibration frequency thereof being 39. 160 kHz.

In FIG. 25, the arrows indicate the displacement directions of the beams at some given instant in time, and this vibration will be called vibration mode 4, in which the paths of the center of the four beams are displaced mutually in parallel, the characteristic vibration frequency thereof being 39.483 kHz.

In FIG. 26, the arrows indicate the displacement directions of the beams at some given instant in time, and this vibration will be called vibration mode 5, in which the paths of the center of the four beams are displaced mutually in parallel, the characteristic vibration frequency thereof being 39.483 kHz.

In FIG. 27, the arrows indicate the displacement directions of the beams at some instant in time, and this vibration mode will be called vibration mode 6, in which the paths of the centers of the four beams are displaced so that the four-beam tuning fork is twisted, the characteristic vibration frequency thereof being 40.150 kHz. The reason that this mode 6 could not be verified by experiment was the strong oscillation of the base part.

Next, FIG. 28 through FIG. 33 will be used to describe the vibration modes for the case in which the cross-section of the beams is a non-square rectangle.

In FIG. 28, the arrows indicate the displacement direction of the beams at some given instant in time, and this vibration mode will be called mode 1, in which the paths of the centers of the four beams are displaced mutually in parallel, the characteristic vibration frequency thereof being 36.617 kHz.

In FIG. 29, the arrows indicate the displacement directions of the beams at some given instant in time, and this vibration mode will be called vibration mode 2, in which the paths of the centers of the four beams are displaced mutually in parallel, the characteristic vibration frequency thereof being 36.939 kHz.

In FIG. 30, the arrows indicate the displacement directions of the beams at some given instant in time, and this vibration mode will be called vibration mode 3, in which the paths of the centers of the four beams are displaced so as to form a diamond shape, the characteristic vibration frequency thereof being 37.099 kHz.

In FIG. 31, the arrows indicate the displacement directions of the beams at some given instant in time, and this vibration mode will be called vibration mode 4, in which the paths of the centers of the four beams are displaced mutually in parallel, the characteristic vibration frequency thereof being 37.256 kHz.

In FIG. 32, the arrows indicate the displacement directions of the beams at some given instant in time, and this vibration mode will be called vibration mode 5, in which the paths of the centers of the four beams are displaced mutually in parallel, the characteristic vibration frequency thereof being 37.608 kHz.

In FIG. 33, the arrows indicated the displacement directions of the beams at some given instant in time, and this vibration mode will be called vibration mode 6, in which the paths of the centers of the four beams are displaced so that the four-beam tuning fork is twisted, the characteristic vibration frequency thereof being 38.101 kHz.

Next, the association action will be described.

In the case of the four-beam tuning fork vibrating gyro that is disclosed in the Japanese Unexamined Patent Publication (KOKAI)No. 6-258083 of the six type of vibration mode of the four-beam tuning fork based on the vibration modes that exist for the case of a rectangular shape, a vibration mode for detection of the Coriolis excitation which is perpendicular to the driving vibration mode is selected, and the configuration for implementing this drive and detection are indicated.

In the first embodiment, the vibration mode 4 for a rectangular shape that is shown in FIG. 31 is taken as the driving vibration mode, and the vibration mode 5 for a rectangular shape that is shown in FIG. 32 is taken as the detection vibration mode. (Although it is not clearly indicated, it is not usual to select a mode with the lower characteristic vibration frequency as the detection vibration mode.)

In the second embodiment, the vibration mode 3 for a rectangular shape that is shown in FIG. 30 is taken as the driving vibration mode, and the vibration mode 1 for a square that is shown in FIG. 22, which does not exist for the case of a rectangular shape, is taken as the detection vibration mode, and a configuration for implementing this driving and detection is indicated.

In the third embodiment, a method is indicated for detecting the vibration mode for a rectangular shape that is shown in FIG. 28 or the vibration mode 2 for a rectangular shape that is shown in FIG. 29 from the first-order coupling of the vibration mode 3 for a rectangular shape that is shown in FIG. 30 and the vibration mode 1 for a square that excites the Coriolis force that is shown in FIG. 22, and a configuration for implementing this driving and detection is indicated.

However, the following problems exists with the four-beam tuning fork that is disclosed in the Japanese Unexamined Patent Publication (KOKAI)No. 6-258083.

First, in the first embodiment, with the vibration mode 4 for a rectangular shape that is shown in FIG. 31 and the vibration mode 5 for a rectangular shape that is shown in FIG. 32, because of the difference between the characteristic vibration frequencies it is not possible to achieve a large detection sensitivity due to the lack of sufficient excitation of vibration mode 5 by vibration mode 4.

With regard to this point, while the Japanese Unexamined Patent Publication (KOKAI)No. 6-258083 has language to the effect of using symmetry, that is, of using a square shape, in actuality there is no vibration mode such as vibration mode 4 and vibration mode 5 for a rectangular shape that are shown in FIG. 31 and FIG. 32 for the case of a square, and the vibration mode such as vibration mode 4 and vibration mode 5 appear for a square, as shown in FIG. 25 and FIG. 26.

Experimentally, if the difference in the characteristic vibration frequencies for the two directions approaches approximately 100,000 ppm, coupling already causes the rectangular vibration mode 4 and vibration mode 5 shown in FIG. 31 and FIG. 32 to cease to exist.

Therefore, the first embodiment which is disclosed in the Japanese Unexamined Patent Publication (KOKAI)No. 6-258083 is either implemented using a non-resonant four-beam tuning fork in which the frequency difference is more than 100,000 ppm, or the by a resonant type which, even without Coriolis force, detects Coriolis force with an extremely high output being made.

In the case of a non-resonant type, because the Coriolis force detection sensitivity will be poor, this will result in a worsened signal-to-noise (S/N) ratio for Coriolis force detection, and in the case of a resonant type it is necessary to detect a Coriolis force from an output that is much larger than the output that is caused by the Coriolis force, this forcing the measurement to be performed with an extremely wide dynamic range, which is disadvantageous from the standpoint of achieving a high S/N ratio.

Additionally, while there is a proposal of a mechanism to limit the output by using a closed loop, this does not change the S/N ratio.

Turning next to the remaining embodiments that are disclosed in the Japanese Unexamined Patent Publication (KOKAI)No. 6-253083, the rectangular vibration mode 5 shown in FIG. 30 is used for driving, and the rectangular vibration mode 1 or mode 2 shown in FIG. 27 and FIG. 28, respectively, or a the square vibration mode 1 which is shown in FIG. 22 and which is generated from the coupling therebetween is used for detection.

In the case of a rectangular shape, if the vibration mode 6, for which detection is not possible, shown in FIG. 33, is eliminated, the vibration mode 3 which is shown in FIG. 30 is the only mode with coincides with the square.

There is a clear difference in characteristic vibration frequency between this and the vibration mode for detection.

With regard to this frequency difference, if one considers the vibration modes which are intrinsically different, even if it is possible to perform adjustment so that the characteristic vibration frequencies coincide, this would affect the overall symmetry of the tuning fork, thereby increasing the vibration noise, making it impossible to achieve a high Coriolis force detection S/N ratio.

An object of the present invention is to provide a vibrating gyro which solves the above-described problems, this vibrating gyro having a high detection sensitivity and good detection accuracy, without influence from the method of support thereof.

SUMMARY OF THE INVENTION

To achieve the above-noted object, a vibrating gyro according to the present invention has the following constitution.

A vibrating gyro according to the present invention basically has the following technical construction in which the vibrating gyro comprising four beams, electrodes, and a base part, wherein the beams are made of an anisotropic crystal that exhibits elasticity and piezo-electric characteristics, the shape of the beams having a longitudinal direction, and two different directions from each other, with interposing 90 degree therebetween and each of which being perpendicular to the longitudinal direction, each being a Y' axis that is rotated within the Y-Z plane of the crystal axes, a Z' axis that is rotated within the Y-Z plane thereof, and the X axis, respectively, the beams having electrodes that are formed on a side surface thereof, the base being made of an anisotropic crystal that exhibits elasticity and piezo-electric characteristics, the base and the four beams being formed together as one, the four beams being disposed in mutually parallel fashion on the base and arranged in equiangular with equidistance with respect to a center of the base, the bottom surface of the base being used for the support thereof, wherein self-excited oscillation is caused using the electrodes of the first and second beams, a first bending vibration being caused to occur, and simultaneously with this, a second bending vibration being generated which has a vibration frequency that coincides with the first bending vibration in a direction that is perpendicular to the first bending vibration, a third bending vibration being generated as a vibration that is synthesized from the first bending vibration and the second bending vibration, a voltage that results from a fifth bending vibration that is a component of a fourth bending vibration in the direction of the first bending vibration and in a direction that is perpendicular to the third bending vibration that is excited by a Coriolis force caused by rotation being detected by means of the electrodes of the third and fourth beams, and a voltage that results from a sixth bending vibration that is a component of the fourth bending vibration in the direction of the second bending vibration is detected by the electrodes of the third and fourth beams.

In the present invention, the cross-sectional configuration of each one of the beams is not restricted to a specific configuration but it is preferably a circular configuration or a rectangular configuration.

More specifically, the vibrating gyro according to the present invention comprising four beams, electrodes, and a base, the beams being made of an anisotropic crystal that exhibits elasticity and piezo-electric characteristics, and further characterized in that the shape of the beams being that of a rectangular prism, the longitudinal direction, width direction, and thickness direction of the beams each being a Y' axis that is rotated within the Y-Z plane of the crystal axes, a Z' axis that is rotated within the Y-Z plane thereof, and the X axis, the beams having electrodes that are formed by metal deposition which is applied to the side surfaces thereof, the base being made of an anisotropic crystal that exhibits elasticity and piezo-electric characteristics, the shape of the base being that of a rectangular prism, the base and the four beams being formed together as one, the four beams being disposed in mutually parallel fashion in the base in a pattern having two rows of two beams each, and the bottom surface of the base being used for the support thereof.

Self-excited oscillation is caused using the electrodes of the first and second beams, and a first bending vibration is caused to occur. In a direction that is perpendicular to the first bending vibration, a second bending vibration is generated which has a vibration frequency that coincides with the first bending vibration. A third bending vibration is generated as a vibration that is synthesized from the first bending vibration and the second bending vibration.

A voltage that results from a fifth bending vibration that is the component of a fourth bending vibration in the direction of the first bending vibration and in a direction that is perpendicular to the third bending vibration that is excited by Coriolis force caused by rotation is detected by means of the electrodes of the third and fourth beams, and a voltage that results from a sixth bending vibration that is the component of the fourth bending vibration in the direction of the second bending vibration is detected by the electrodes of the third and fourth beams.

In one aspect of the present invention, the anisotropic crystal is quartz, and the rotation angle within the Y-Z plane of this crystal is −17±2 degrees, which is an angle that is rotated 17±2 degrees from the Z axis in the Y-axis direction, the four parallel beams which are disposed in mutually parallel fashion on said base and arranged in equiangular with equidistance with respect to a center of said base, and more specifically, they may be disposed in a square, two-row/two-column arrangement, and the base of the vibrating gyro are adjusted so that the resonant frequency of the first bending vibration almost coincides with the resonant frequency of the second bending vibration, by making the ratio of the width in the Z' direction to the width in the X direction be 0.9946±0.02.

In another aspect of the present invention, the anisotropic crystal is lithium tantalate, and the rotation angle within the Y-Z plane of this crystal is −12±2 degrees, which is an angle that is rotated 12±2 degrees from the Z axis in the Y-axis direction, the four parallel beams, which are disposed and arranged in the same manner as explained above, and the base of the vibrating gyro are adjusted so that the resonant frequency of the first bending vibration almost coincides with the resonant frequency of the second bending vibration, by making the ratio of the width in the Z' direction to the width in the X direction be 0.9952±0.02.

In another aspect of the present invention, the anisotropic crystal is lithium niobate, and the rotation angle within the Y-Z plane of this crystal is −15±2 degrees, which is an angle that is rotated 15±2 degrees from the Z axis in the Y-axis direction, the four parallel beams, which are disposed and arranged in the same manner as explained above, and the base of the vibrating gyro are adjusted so that the resonant frequency of the first bending vibration almost coincides with the resonant frequency of the second bending vibration, by making the ratio of the width in the Z' direction to the width in the X direction be 0.9965±0.02.

In another aspect of the present invention, that the resonant frequency of the first bending vibration and the resonant frequency of the second bending vibration are extremely close, the positions of the branching points of the four beams of the vibrating gyro which are disposed in a square, two-row/two-column arrangement are adjusted so that the beam length as seen from the X direction and the beam length as seen from the Z' direction are different.

In yet another aspect of the present invention, the oscillator circuit for generating the first bending vibration and the oscillator circuit for generating the second bending vibration are implemented as one oscillator circuit, rather than as separate oscillator circuits.

In another aspect of the present invention, the electrodes of the third beam and the fourth beam that exhibit the third bending vibration are electrically connected so as to perform addition so that mutual displacement directions thereof at some given instant in time detect opposite direction signals.

Another aspect of the present invention has an electrode that extracts a signal that is caused by the third bending vibration from the voltage output which is generated in the third beam by a vibration synthesized from the third bending vibration and the fourth bending vibration, a phase-shifting circuit that shifts the phase of the output from the electrode by 90 degrees, a binary quantizing circuit that binarizes the output of the phase-shift circuit, an electrode that extracts a signal that is caused by the fourth bending vibration from the voltage output which is generated in the third beam by a vibration synthesized from the third bending vibration and the fourth bending vibration, and a lock-in amplifier which detects the output from this electrode by using the output of the above-noted binary quantizing circuit.

Another aspect of the present invention has an electrode that extracts a voltage output which is generated in the third beam by a vibration synthesized from the first bending vibration and the fifth bending vibration, an electrode which extracts a voltage output which is generated in the third beam by a vibration synthesized from the second bending vibration and the sixth bending vibration, an adding circuit that adds the outputs from these electrodes, a phase-shift circuit that shifts the output from the adding circuit by 90 degrees, a binary quantizing circuit that binarizes the output of the phase-shift circuit, an electrode that extracts a voltage output which is generated in the third beam by a vibration synthesized from the first bending vibration and the fifth bending vibration, an electrode that extracts a voltage output that is generated in the third beam by a vibration synthesized from the second bending vibration and the sixth bending vibration, a subtraction circuit which subtracts the outputs from these electrodes, and a lock-in amplifier which detects the output of the subtraction circuit by using the output of the above-noted binary quantizing circuit.

Yet another aspect of the present invention has a lowpass filter for the purpose of adjusting the output signal of the oscillator circuit so that the amplitude and phase of the first bending vibration coincide with the amplitude and phase of the second bending vibration.

In a vibrating gyro according to the present invention, by disposing the four beams in a square, two-row/two-column arrangement that has good symmetry, as one example, regardless of the vibration used the base part will be approximately immobile, without using vibration that is influenced by the support part, such as with extraplanar vibrations in a tuning fork type gyro, thereby enabling angle detection with good accuracy and no influence on the performance by the support method.

Because the same vibration mode is used in both vibration stimulus and detection, it is possible because of the structure to obtain a large signal output for the detection direction, and because the configuration enables cancellation of an output other than the Coriolis force, it is possible to achieve a high S/N ratio. Further, because separate beams can be used for vibration stimulus and detection, there is almost no DC drift related to phase shift caused by the oscillation system.

DETAILED DESCRIPTION OF THE PREFERRED EMBODIMENTS

Preferred embodiments of a vibrating gyro according to the present invention are described below, with reference being made to the relevant accompanying drawings.

FIG. 1 through FIG. 12 and FIG. 14 through FIG. 20 show a vibrating gyro that is an embodiment of the present invention.

Figure 1:
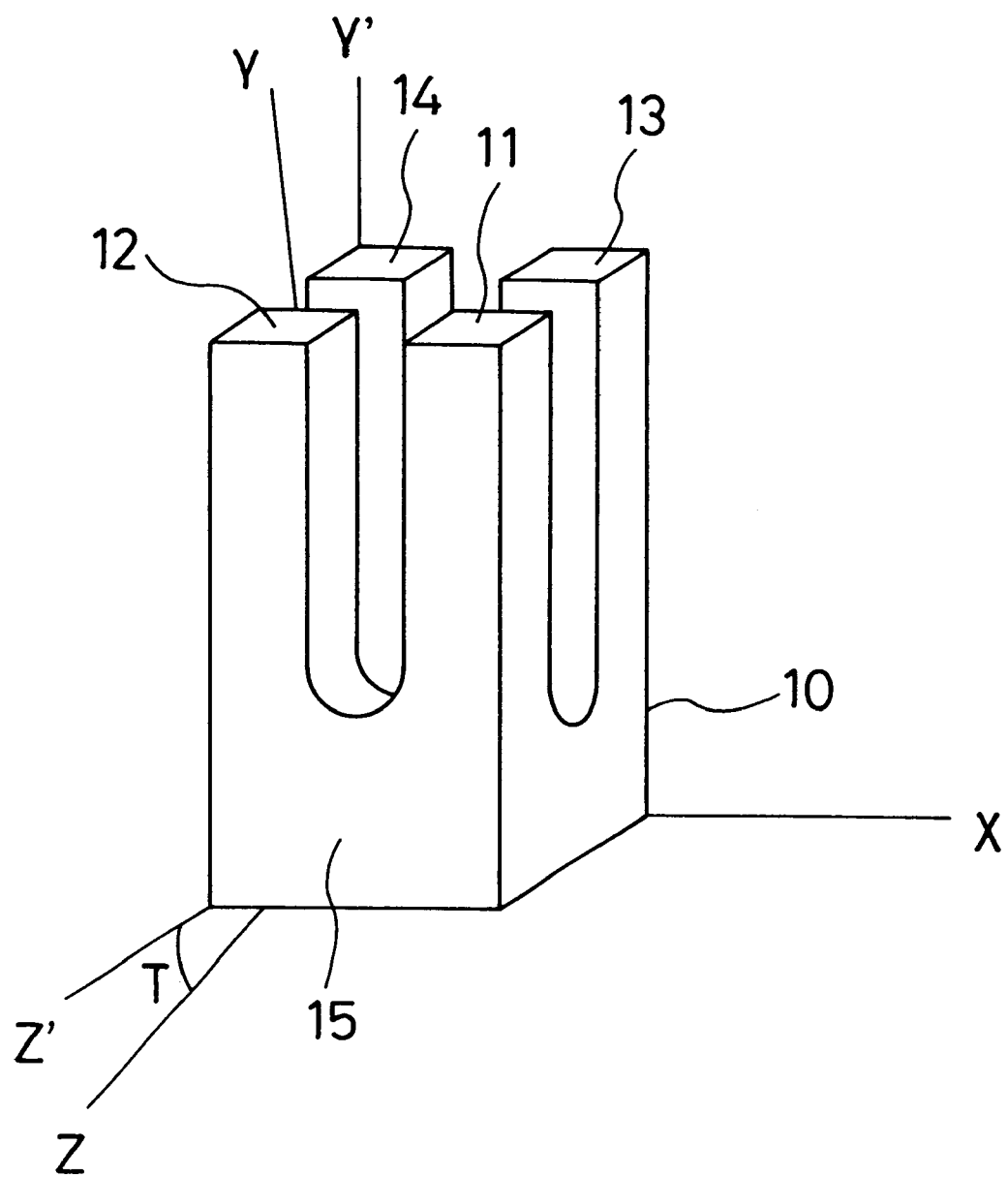
FIG. 1 is a perspective view that shows an outer view of a four-beam tuning fork type vibrating gyro that is an embodiment of the present invention, indicating the coordinates that are used in the description thereof and the rotation direction of the anisotropic crystal.

FIG. 1 shows the outer appearance of a four-beam tuning fork vibrating gyro, this indicating the coordinate axes that will be used in the descriptions thereof to follow as well as the rotational direction of the anisotropic crystal.

Figure 2:
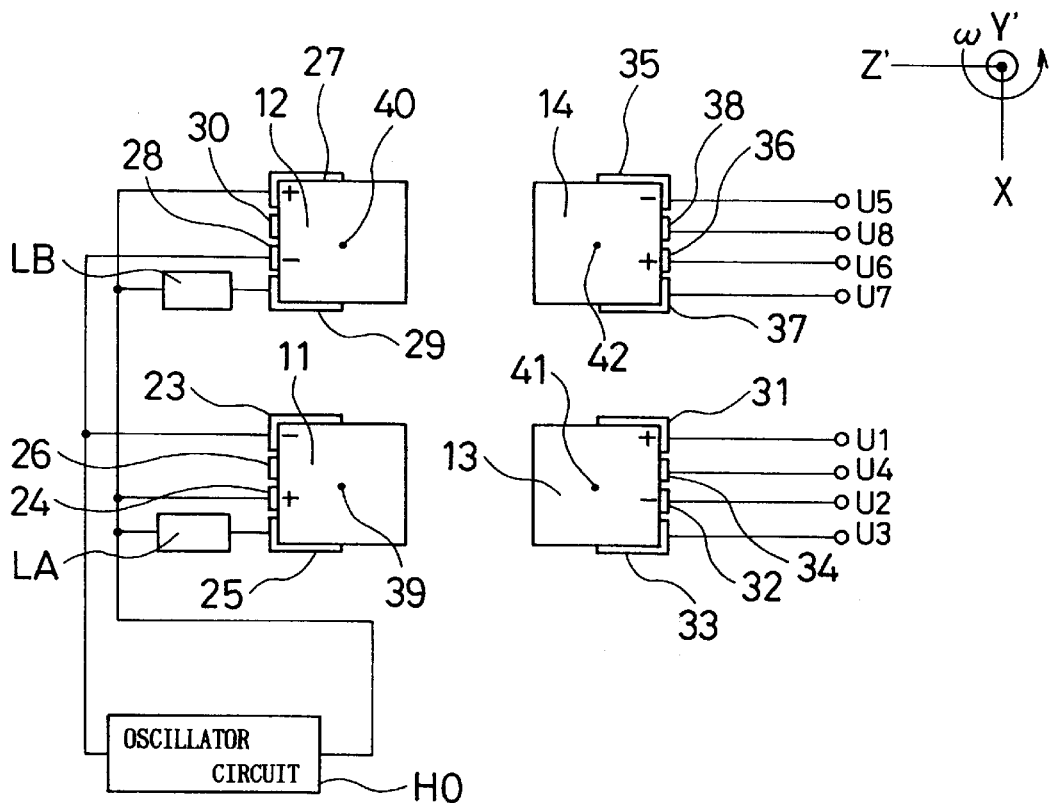
FIG. 2(A) is a drawing which shows the cross-sections of the beams of a four-beam tuning fork vibrating gyro that is an embodiment of the present invention as viewed from the ends of the beams and a schematic wiring diagram thereof.
FIG. 2(B) is a drawing which shows a circuit block diagram thereof, and a schematic wiring diagram thereof.
Figure 2:
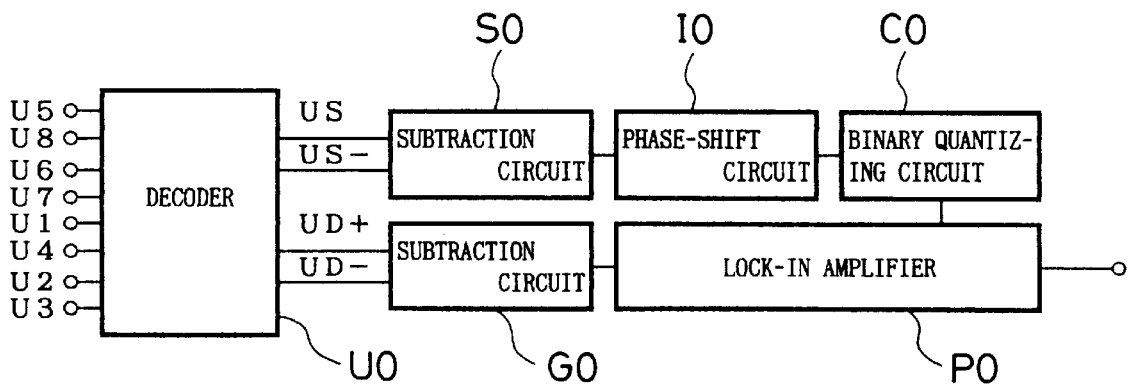

FIG. 2 shows a cross-sectional view of the beams, seen from the ends thereof, a block diagram, and a schematic wiring diagram of a four-beam tuning fork vibrating gyro.

Figure 3:
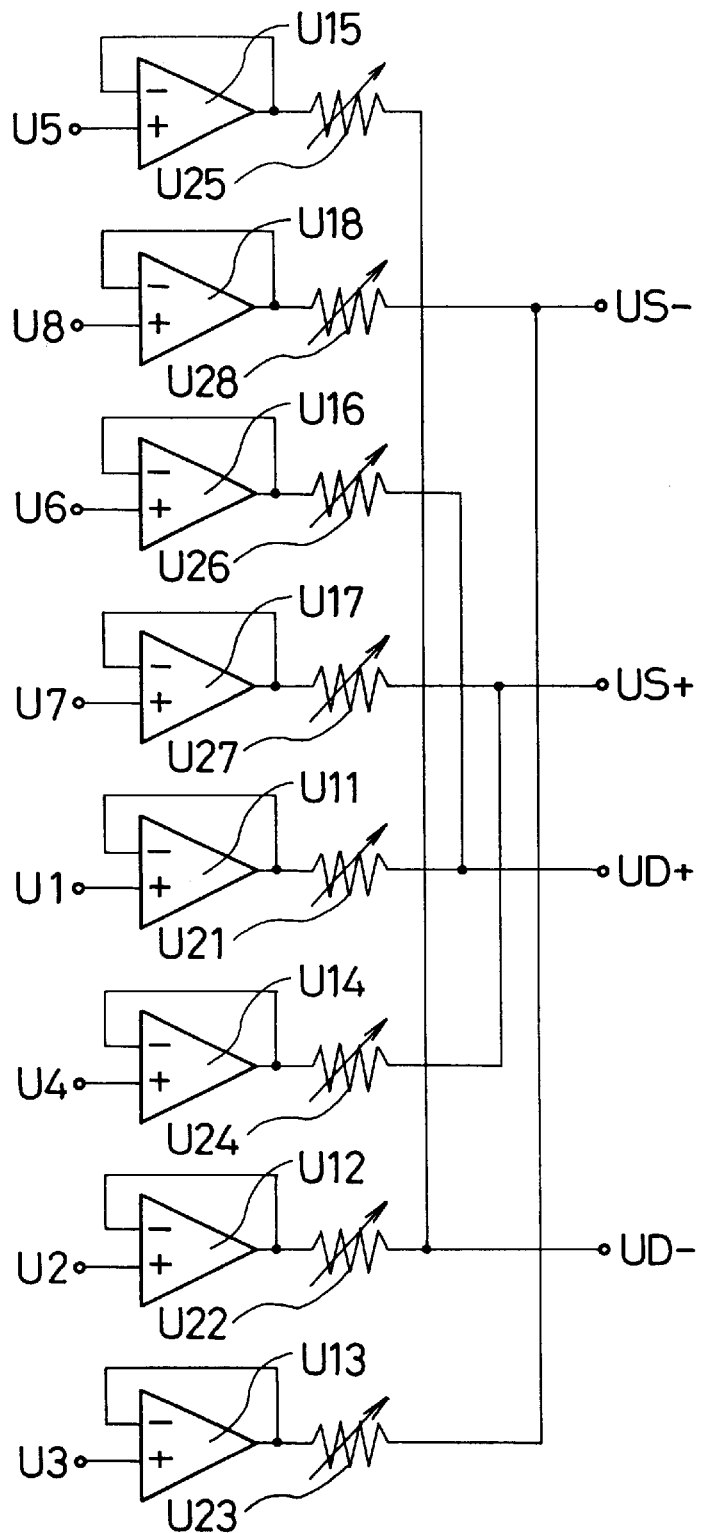
FIG. 3 is a circuit diagram that shows the connections between the electrodes and the circuits of a four-beam tuning fork vibrating gyro that is an embodiment of the present invention.

FIG. 3 is a circuit diagram which shows the connections between the electrodes and the circuit of a four-beam tuning fork vibrating gyro 10.

Figure 4:
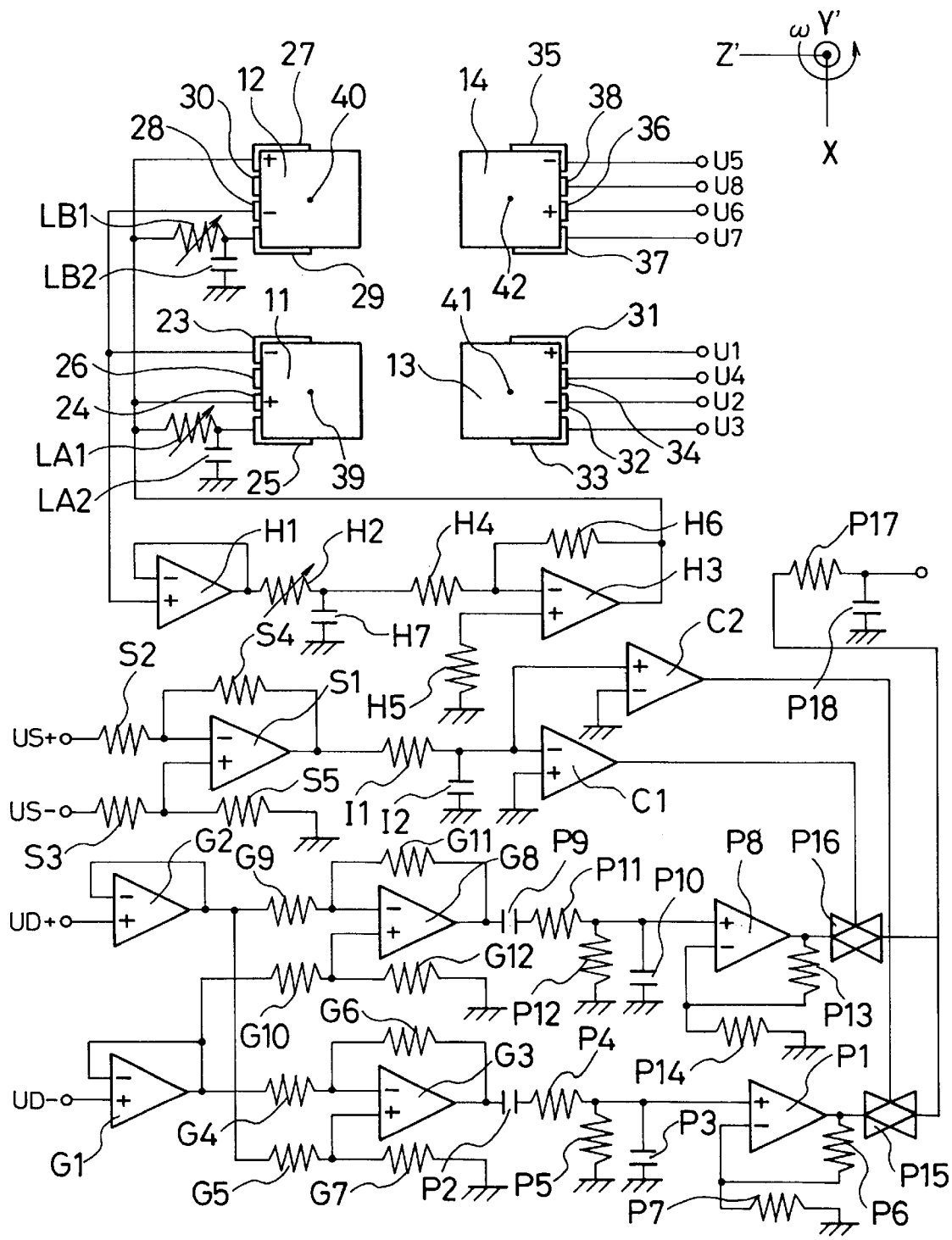
FIG. 4 is a cross-sectional view of the beams seen from the ends thereof, a detailed circuit example, and a schematic diagram of a four-beam tuning fork vibrating gyro that is an embodiment of the present invention.

FIG. 4 shows a cross-sectional view of the beams, seen from the ends thereof, an accurate block diagram, and an accurate schematic wiring diagram of a four-beam tuning fork vibrating gyro.

Figure 5:
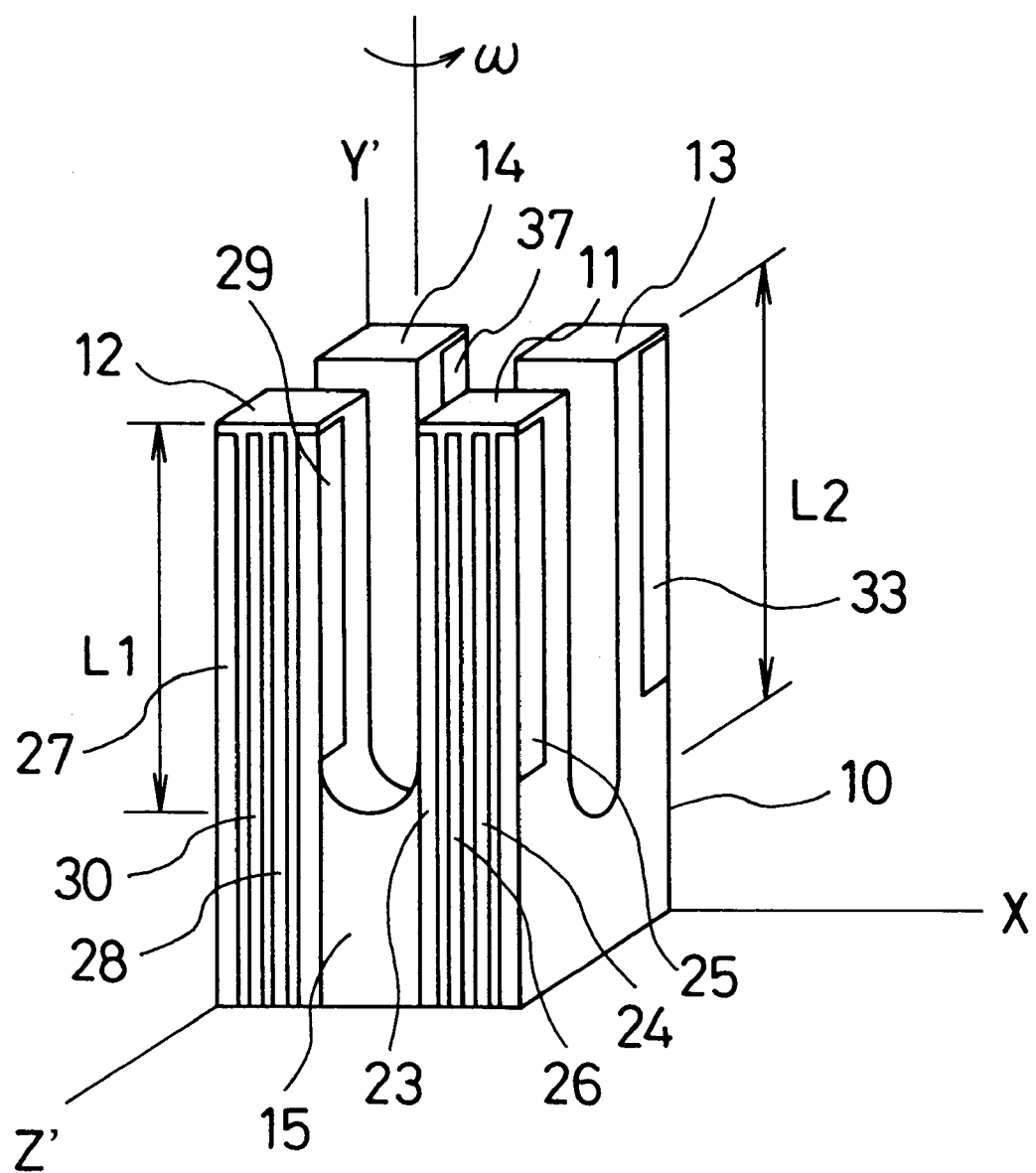
FIG. 5 is a side elevation drawing which shows the position of the electrodes and the position of the branching point for adjusting the vibration in a four-beam tuning fork vibrating gyro that is an embodiment of the present invention.

FIG. 5 is a side elevation drawing which shows the position of the electrodes and the position of the branch points for the purpose of vibration adjustment.

Figure 6:
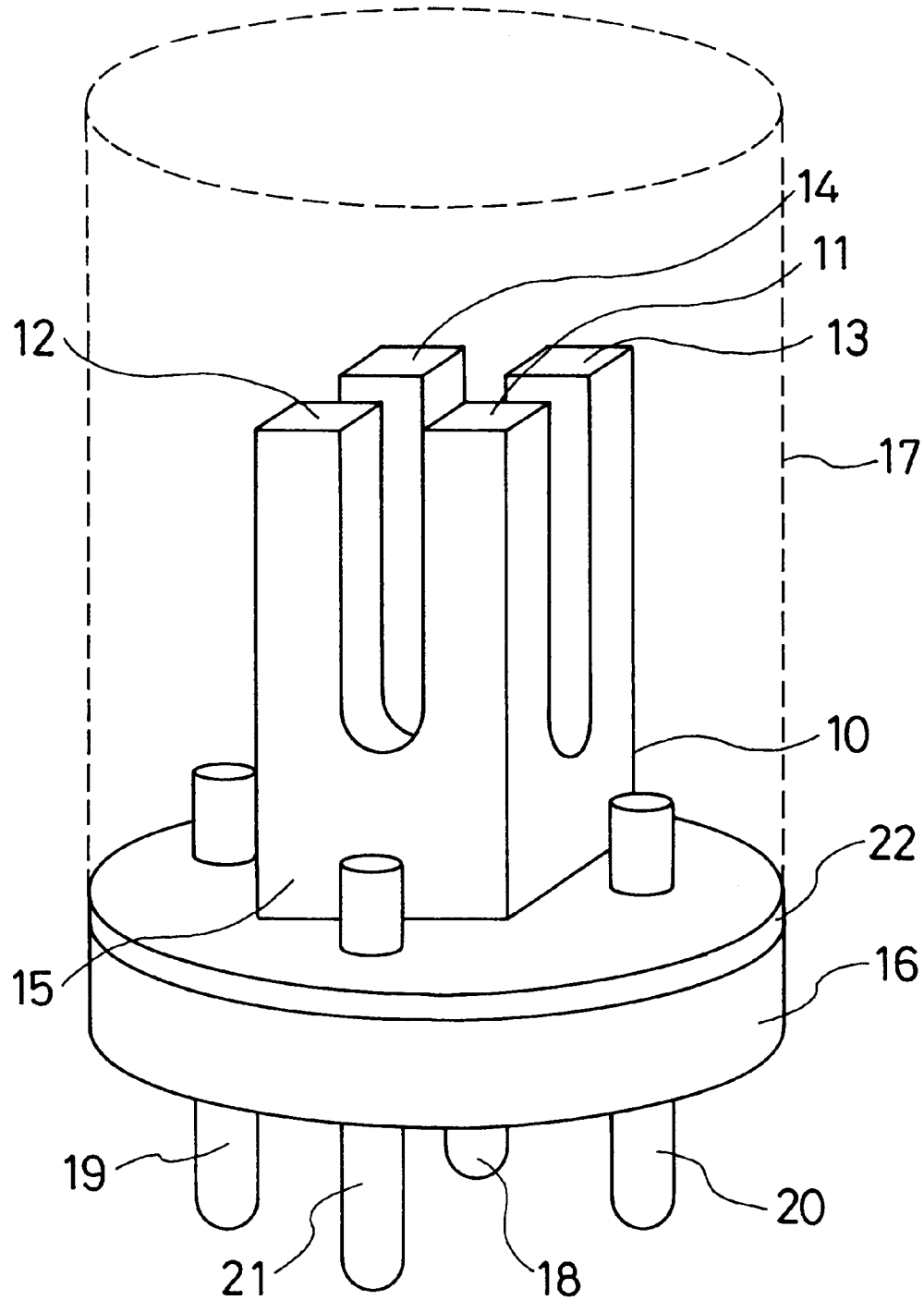
FIG. 6 is an outer view drawing which shows the configuration of a gyro element of a four-beam tuning fork vibrating gyro that is an embodiment of the present invention sealed in a cylindrical tube.

FIG. 6 is an outer view drawing which shows the configuration of a vibrating gyro sealed in a cylindrical tube.

FIGS. 7, 8, 9, 10, 11, and 12 are drawings illustrating the operation of a four-beam tuning fork vibrating gyro, which show the four beams as seen from the end of the beams.

Figure 14:
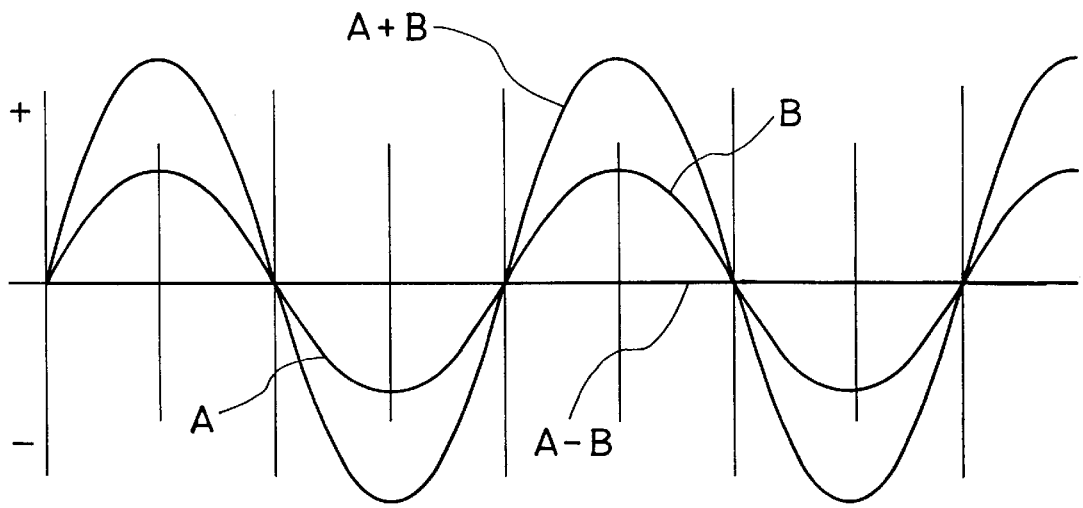
FIG. 14 is a waveform diagram which shows the signals from electrodes.
Figure 15:
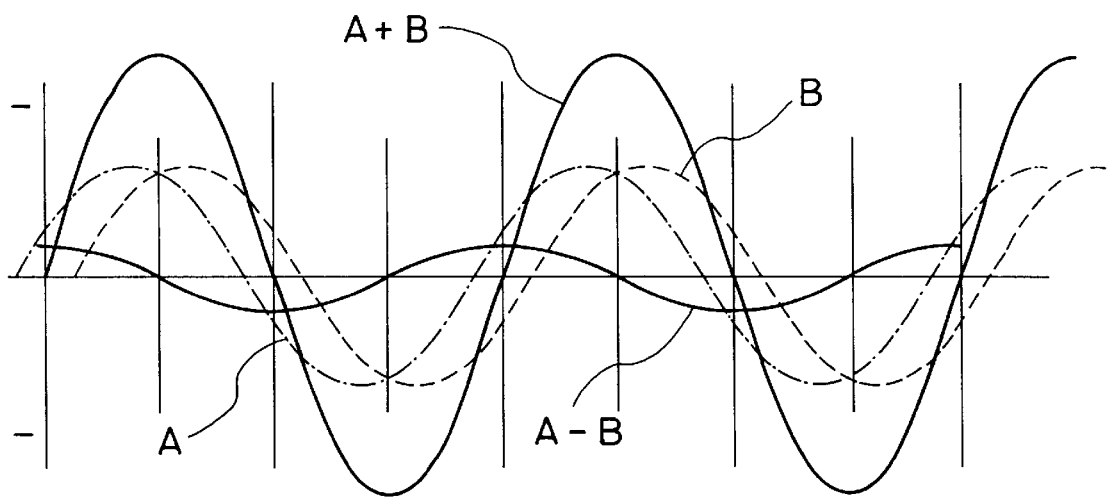
FIG. 15 is a waveform diagram which shows the signals from electrodes.
Figure 16:
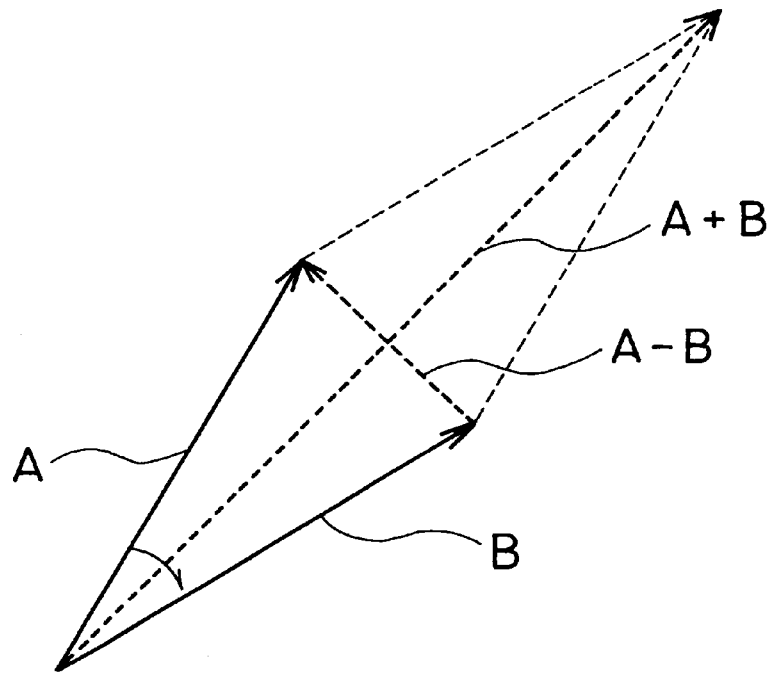
FIG. 16 is a drawing which illustrates the operation in the form of vector representations of signals from electrodes.
Figure 21:
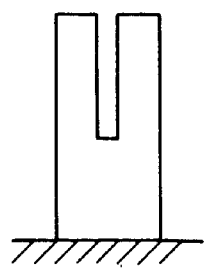
FIG. 21 is a front elevation view of a general type of four-beam tuning fork.

FIG. 14 and FIG. 15 are waveform diagrams which show waveforms from electrodes, while FIG. 16 is a drawing which illustrates operation of a four-beam tuning fork vibrating gyro in the form of vector representation of signals from the electrodes.

Figure 17:
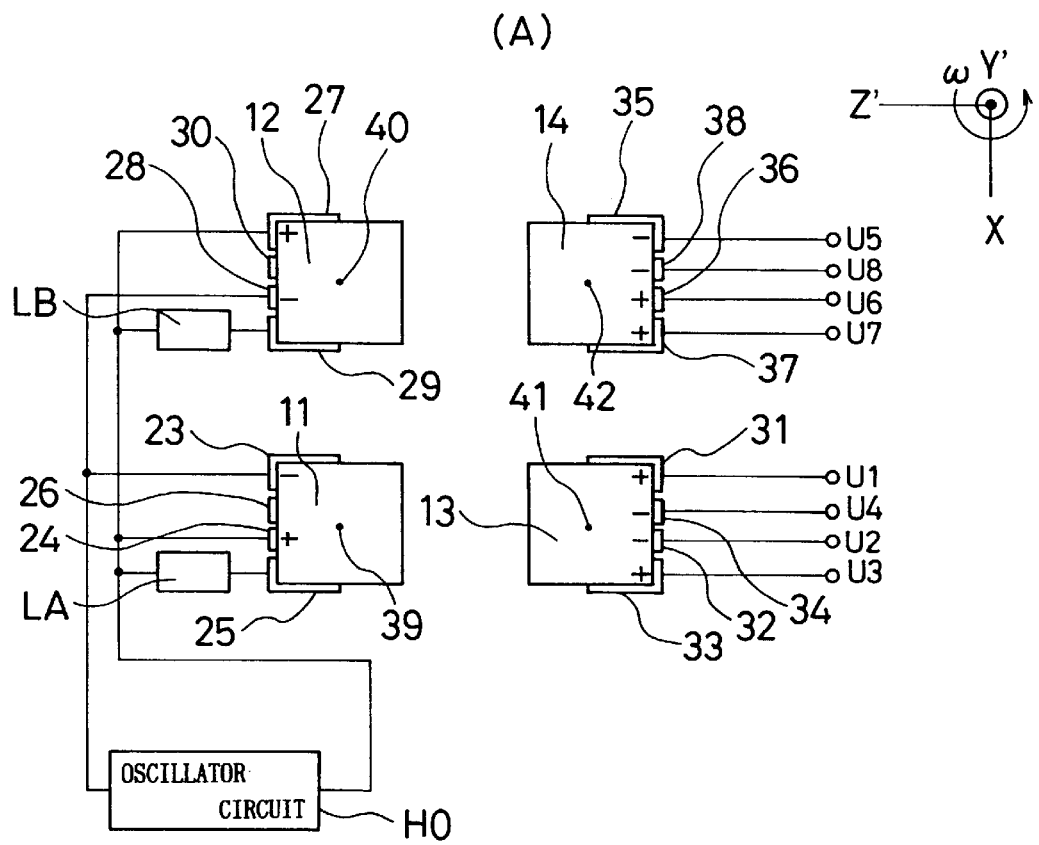
FIG. 17(A) is a drawing which shows the cross-sections of the beams of a four-beam tuning fork vibrating gyro that is an embodiment of the present invention as viewed from the ends of the beams and a schematic wiring diagram thereof.
FIG. 17(B) is a drawing which shows a circuit block diagram thereof, and a schematic wiring diagram thereof.
Figure 17:
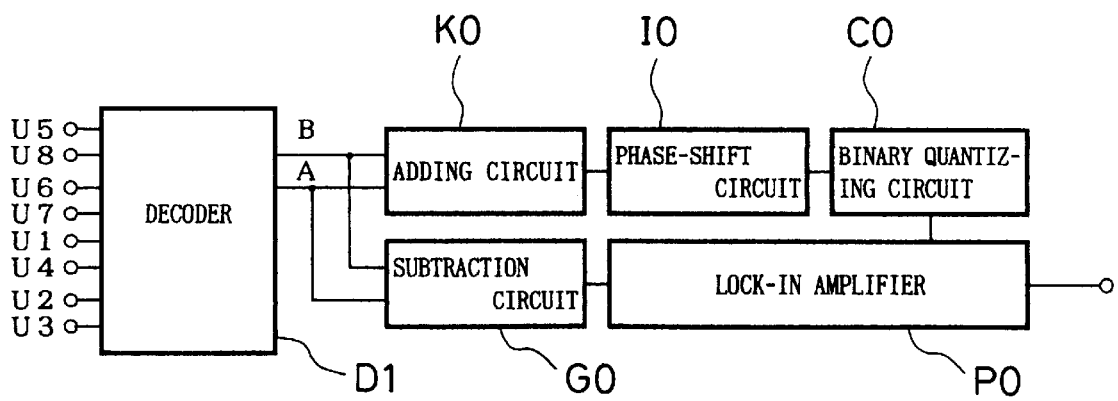
Figure 18:
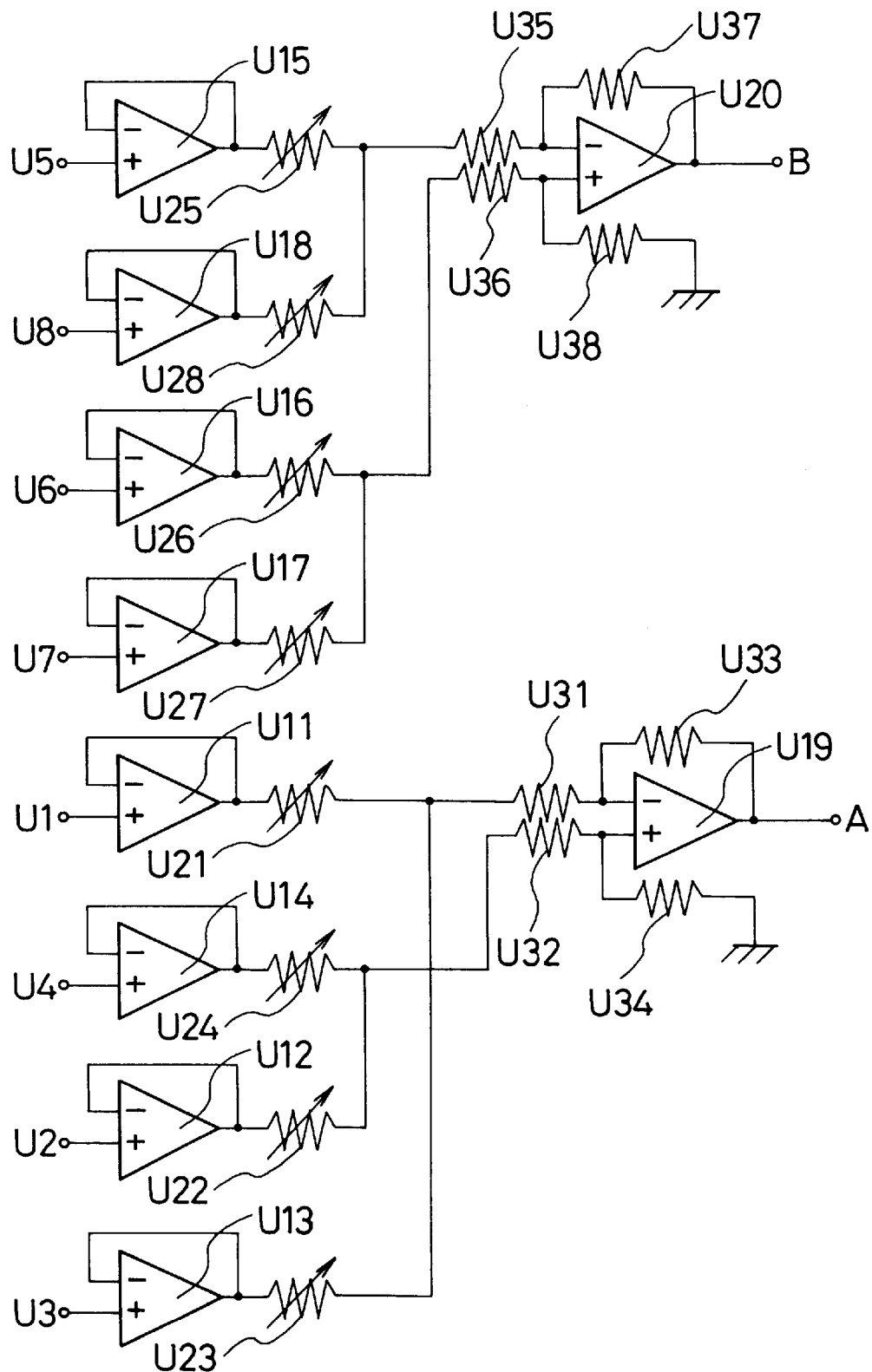
FIG. 18 is a circuit diagram which shows the connections between the electrodes and the circuit of a four-beam tuning fork vibrating gyro that is an embodiment of the present invention.

FIG. 17 shows the cross-sections of the beams of a four-beam tuning fork vibrating gyro as viewed from the ends of the beams thereof, a circuit block diagram thereof, and a schematic wiring diagram thereof. FIG. 18 is a drawing which shows the connections between the electrodes and the circuit of a four-beam tuning fork vibrating gyro 10.

Figure 19:
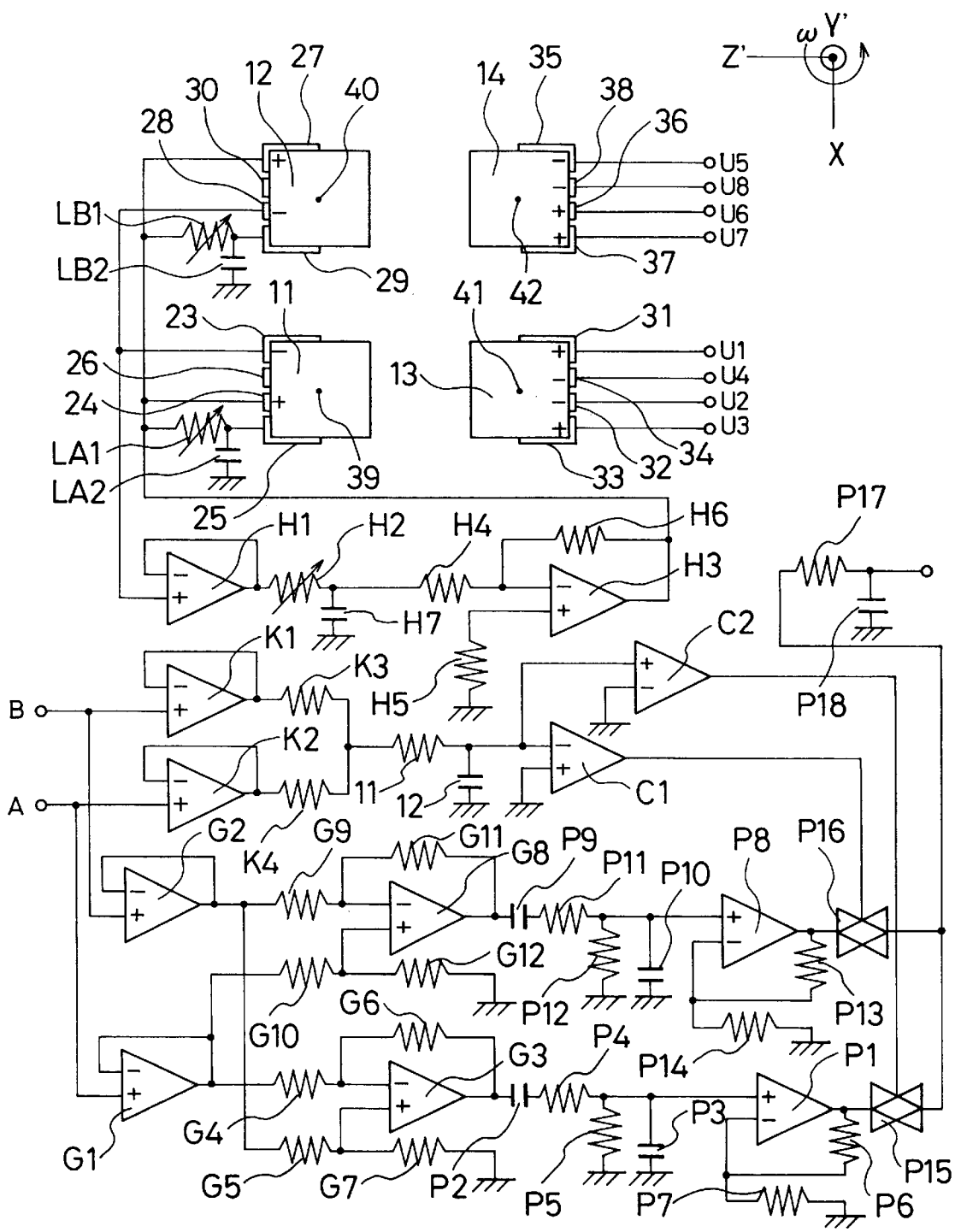
FIG. 19 is a cross-sectional view of the beams seen from the ends thereof, a detailed circuit example, and a schematic diagram of a four-beam tuning fork vibrating gyro that is an embodiment of the present invention.
Figure 20:
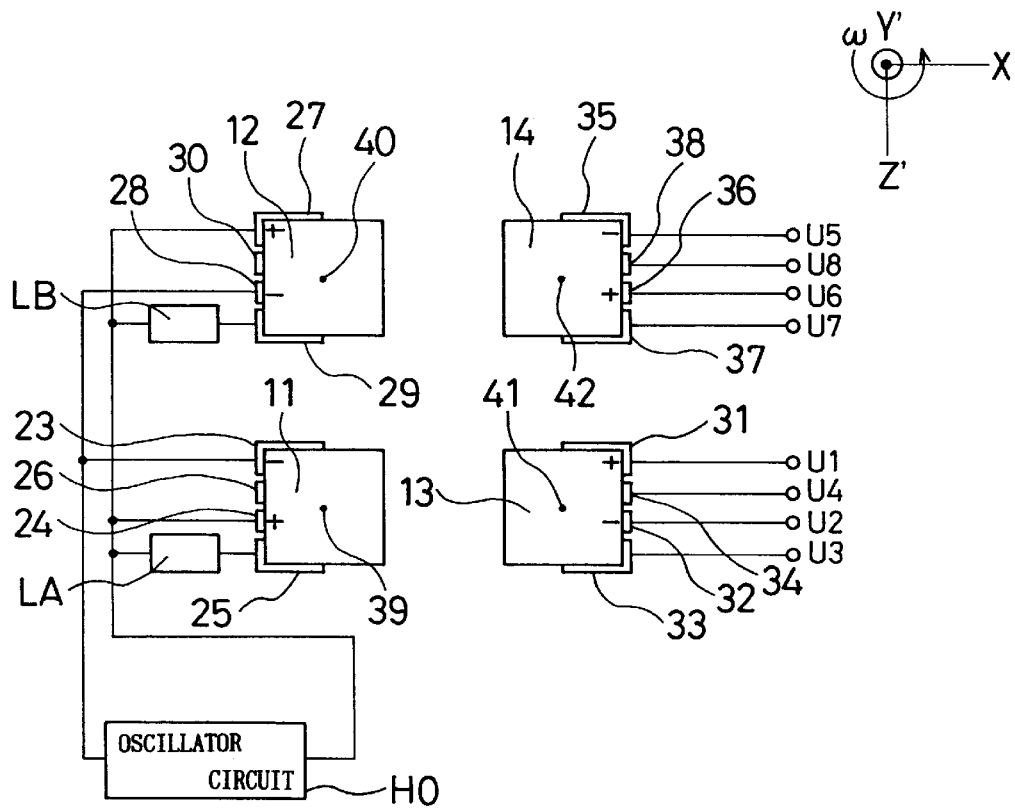
FIG. 20(A) is a drawing which shows the cross-sections of the beams of a four-beam tuning fork vibrating gyro that is an embodiment of the present invention as viewed from the ends of the beams and a schematic wiring diagram thereof.
FIG. 20(B) is a drawing which shows a circuit block diagram thereof, and a schematic wiring diagram thereof.
Figure 20:
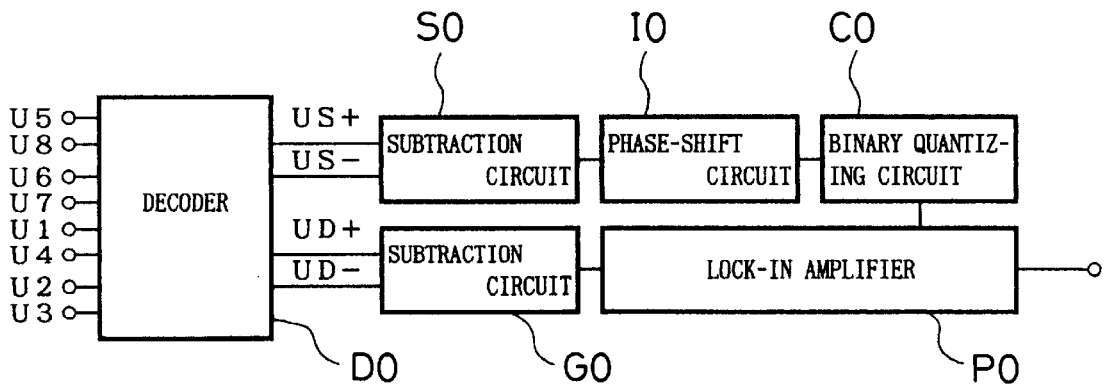
Figure 22:
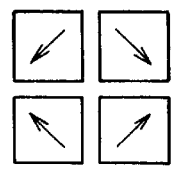
FIG. 22 is a cross-sectional view of as seen from the ends of the beams of a tuning fork, showing a vibration mode 1.
Figure 23:
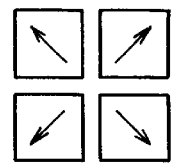
FIG. 23 is a cross-sectional view of as seen from the ends of the beams of a tuning fork, showing a vibration mode 2.
Figure 24:
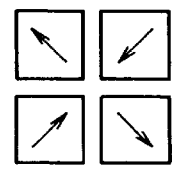
FIG. 24 is a cross-sectional view of as seen from the ends of the beams of a tuning fork, showing a vibration mode 3.
Figure 25:
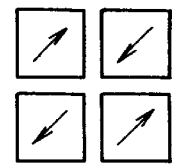
FIG. 25 is a cross-sectional view of as seen from the ends of the beams of a tuning fork, showing a vibration mode 4.
Figure 26:
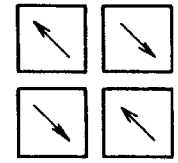
FIG. 26 is a cross-sectional view of as seen from the ends of the beams of a tuning fork, showing a vibration mode 5.
Figure 27:
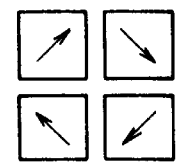
FIG. 27 is a cross-sectional view of as seen from the ends of the beams of a tuning fork, showing a vibration mode 6.
Figure 28:
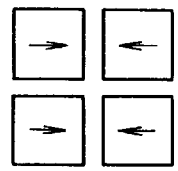
FIG. 28 is a cross-sectional view of as seen from the ends of the beams of a tuning fork, showing a vibration mode 1.
Figure 29:
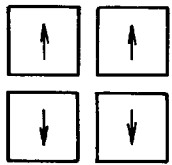
FIG. 29 is a cross-sectional view of as seen from the ends of the beams of a tuning fork, showing a vibration mode 2.
Figure 30:
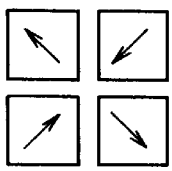
FIG. 30 is a cross-sectional view of as seen from the ends of the beams of a tuning fork, showing a vibration mode 3.
Figure 31:
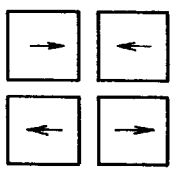
FIG. 31 is a cross-sectional view of as seen from the ends of the beams of a tuning fork, showing a vibration mode 4.
Figure 32:
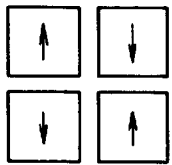
FIG. 32 is a cross-sectional view of as seen from the ends of the beams of a tuning fork, showing a vibration mode 5.
Figure 33:
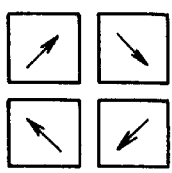
FIG. 33 is a cross-sectional view of as seen from the ends of the beams of a tuning fork, showing a vibration mode 6.

FIG. 19 is a cross-sectional view of the beams seen from the ends thereof, a detailed circuit example, and a schematic wiring diagram of a four-beam tuning fork vibrating gyro, while FIG. 20 a cross-sectional view of the beams of a four-beam tuning fork vibrating gyro as viewed from the ends of the beams.

The construction of a vibrating gyro will next be described, with reference being made to FIG. 1, FIG. 2, FIG. 3, FIG. 4, FIG. 6, FIG. 17, FIG. 18, FIG. 19, and FIG. 20.

As shown in FIG. 1, the four-beam tuning fork vibrating gyro 10 is formed by a first beam 11, a second beam 12, a third beam 13, a fourth beam 14, and a base part 15.

The beams are made from an anisotropic crystal that exhibits both elasticity and piezo-electric characteristics, its shape is not restricted to a specific configuration but it may preferably be a square prism, and the there are electrodes on the side surfaces of the beams which are formed thereonto by suitable method, for example, an etching method, a plating method a metallic deposition method or the like.

The base part 15 is made of an anisotropic crystal that exhibits both elasticity and piezo-electric characteristics, and its shape is not restricted to a specific configuration but it may preferably be a square prism.

The first beam 11, second beam 12, third beam 13, and fourth beam 14 are disposed in mutually parallel directions onto the four vertices of the square base part 15, and the base part 15 is formed together as one with the first beam 11, second beam 12, third beam 13, and fourth beam 14.

The anisotropic crystal that is generally used as the resonator in an embodiment of the present invention is, for example, quartz, a crystal of SiO2, a three-direction crystal system which has four crystal axes at room temperature.

One of the crystal axes is referred to as the c axis, this being an axis that passes through a crystal vertex, the remaining three axes being called a axes, these being crystal axes which form mutual angles of 120 degrees with planes that are perpendicular to the c axis.

Any one of the three a axes is taken as the X axis, the c axis being taken as the Z axis, and the direction that is perpendicular to the X axis and the Z axis being taken as the Y axis.

In addition to quartz, it is possible to use lithium tantalate or lithium niobate single crystals.

Lithium tantalate and lithium niobate single crystals have very similar characteristics, and both have a piezo-electric efficiency that is good compared to quartz, but have aging characteristics that are worse than quartz.

All three have good characteristics for use in a vibrating gyro.

In implementing the vibrating gyro, while any one of these crystals can be used, it must be remembered that the piezo-electric characteristics of lithium tantalate and lithium niobate single crystals are manifest in a different direction from that of quartz.

The four-beam tuning fork vibrating gyro 10 is cut so that, in terms of the X, Y, and Z axes which are shown in FIG. 1, each of the sides are set in parallel to Y' coordinate axis which is rotated by T degrees about the X axis, in a direction from the Z axis to the Y axis, to the Z' coordinate axis which is rotated by T degrees about the X axis, in a direction from the Z axis to the Y axis, and to the X axis, respectively.

When doing this, the rotation angle T is 17±2 degrees for the case of quartz, 12±2 degrees for the case of lithium tantalate, and 15±2 degrees for the case of lithium niobate.

In consideration of the coordinate system, these rotation angles are generally indicated as −17±2, −12±2, and −15±2 degrees, respectively.

In this arrangement, the beam longitudinal direction (the length direction of the beam) is taken as the Y' axis, the width direction is taken as the Z' axis, and the thickness direction is taken as the X axis.

The longitudinal, width, and thickness directions of a four-beam tuning fork vibrating gyro 10 cut in the above-noted manner, are parallel to the Y' axis, the Z' axis, and the X axis, respectively.

However, because there is symmetry within the X-Z' plane in the four-beam tuning fork vibrating gyro 10, the terms width and thickness as used herein do not have any particular meaning.

In the description that follows, the X or Z' direction will be referred to as the width direction.

FIG. 5 shows the condition of electrodes formed onto the first beam 11, the second beam 12, by means of metal deposition, for the example of using quartz as the anisotropic crystal.

The shape of the electrodes is established by first fabricating a mask by etching, and then affixing this mask onto the surfaces of the four-beam tuning fork vibrating gyro 10 to which electrodes are to be formed, and performing vacuum deposition.

Electrodes 23, 24, 25, and 26 are deposited onto the first beam 11, and the electrodes 27, 28, 29, and 30 are deposited onto the second beam 12.

Similar electrodes are deposited onto the third beam 13 and the fourth beam 14, although the perspective view format of this drawing does not allow these to be shown.

Electrodes 31, 32, 33, and 34 are deposited onto the third beam 13, and electrodes 35, 36, 37, and 38 are deposited onto the fourth beam 14.

For the metal electrodes on the inside of the branching point, the metal mask is disposed so as to be slightly distant from the surface onto which deposition is to be done, and deposition is done from a direction that is slightly inclined with respect the direction that is perpendicular to the surface onto which deposition is to be done.

FIG. 2 shows the electrodes 23, 24, 25, 26, 27, 28, 29, 30, 31, 32, 33, 34, 35, 36, 37, and 38, part of which are shown in FIG. 5, and the cross-sectional view of the first beam 11, the second beam 12, the third beam 13, and the fourth beam 14 cut by the X-Z' plane.

Four each of the electrodes of the a four-beam tuning fork vibrating gyro 10, are aligned along the outer sides of the beams in a direction that is parallel to the X axis, the two electrodes at each end thereof being formed so as to bend around to side surfaces of the beams that are parallel to the Z' axis and which make contact with the surface on which the four electrodes are aligned, and each of these to electrodes extends to the middle of these side surfaces to which they wrap around.

The cross-sectional view position of the electrodes which is shown in FIG. 2 spreads with no change in the Y' direction, and as shown in FIG. 5, there are four each electrodes parallel to the Y' direction on the beams.

With the exception of the part of electrodes that wrap around to other surfaces, electrodes that are formed in parallel to the X axis extend in parallel at the base part as well and extend to the bottom surface of the base part.

This part functions as wiring which establishes electrical conductivity to a substrate or the like that holds the base part.

In the case of quartz, because the direction of application of a voltage to cause expansion and contraction in the Y' direction is the X direction, the electrodes are lined up on a surface that is parallel to the X direction as shown.

In the case of lithium tantalate and lithium niobate single crystals, however, because the direction of application of voltage to cause expansion and contraction in the same Y' direction is the Z' direction, the electrodes have exact same shape as for the case of quartz, but must be disposed so as to be lined up on surfaces that are parallel to the Z' direction.

FIG. 20 shows an example of the electrode arrangement for the case of using either lithium tantalate or lithium niobate single crystals.

Note that the symbols that indicate the coordinates are rotated 90 degrees with respect to the case of quartz.

An example will be described below for the case of quartz. However, with the exception that the coordinates X and Z' are interchanged, the description would be exactly the same for the case of either lithium tantalate or lithium niobate, and the embodiment of the present invention can be made with either of those crystals as well.

FIG. 2 shows the vibration stimulus electrodes 23, 24, 25, 26, 27, 28, 29, and 30 and the oscillator circuit H0 that is used to self-excite all the beams, the lowpass filters LA and LB that adjust the oscillation condition, the terminals U1 through U8 that are used to extract signals from the detection electrodes 31, 32, 33, 34, 35, 36, 37, and 38, the decoder D0 that decodes the signals from the terminals U1 through U8, the phase-shift circuit I0 that changes the phase of the US+ and US– outputs from the decoder D0, the binary quantizing circuit C0 that binarizes the signal from the phase-shift circuit, and a lock-in amplifier P0 that phase-detects and converts the UD+ and UD– signals from the decoder D0 to a voltage signal by using a reference signal, and indicates the interconnections between these elements.

FIG. 3 shows the wiring between the interference buffers U11, U12, U13, U14, U15, U16, U17, and U18 which convert the impedance of the signals from the terminals U1 through U8, the resistances U21, U22, U23, U24, U25, U26, U27, and U28 which perform addition and adjustment, and the terminals US+, US–, UD+, and UD–.

FIG. 4 shows, as an example of an implementation of the oscillator circuit H0 of FIG. 2, an operational amplifier H1 that serves as an interference buffer, a trimmer resistor H2 and capacitor H7 that form a lowpass filter, and an operational amplifier H3 and resistances H4 through H6 which form an inverting amplifier.

In FIG. 4, the trimmer resistor LA1 and capacitor LA2 are shown as an example of an implementation of the lowpass filter LA of FIG. 2.

In FIG. 4, the trimmer resistor LB1 and capacitor LB2 are shows as an example of an implementation of the lowpass filter LB of FIG. 2.

In FIG. 4, the operational amplifier S1 and resistances S1 through S5 are shown as an example of an implementation of the subtraction that converts the dual-phase positive/negative signals to a signal with respect to ground, this signal to be input to the phase-shift circuit I0 of FIG. 2.

In FIG. 4, the resistance I1 and the capacitor I2 which serves as a lowpass filter are shown as an implementation of the phase-shift circuit I0 of FIG. 2.

In FIG. 4, a first comparator C1 and a second comparator C2 are shown as an implementation of the binary quantizing circuit C0 of FIG. 2.

In FIG. 4, interference buffers G1 and G2, operational amplifiers G3 and resistances G4 through G7 which serve as a first differential operational amplifier, and operational amplifier G8 and resistances G9 through G12 which serve as a second differential operational amplifier are shown as an implementation of the subtraction which converts the dual-phase positive/negative signals to a signal with respect to ground and the phase-inverted signal thereof which is to be input to the lock-in amplifier P0 of FIG. 2.

In FIG. 4, an operational amplifier P1, capacitors P2 and P3, and resistances P4 through P7 which serve as a first bandpass filter, the operational amplifier P8, capacitors P9 and P10, and resistances P11 through P14 which serves as a second bandpass filter, a first analog switch P15, a second analog switch P16, and a resistance P17 and capacitor P18 which serve as a lowpass filter are shown as an implementation of the lock-in amplifier of FIG. 2.

FIG. 17 shows the vibration stimulus electrodes 23, 24, 25, 26, 27, 28, 29, and 30 and the oscillator circuit H0 that is used to self-excite all the beams, the lowpass filters LA and LB that adjust the oscillation condition, the terminals U1 through U8 that are used to extract signals from the detection electrodes 31, 32, 33, 34, 35, 36, 37, and 38, the decoder D1 that decodes the signals from the terminals U1 through U8, the adding circuit K0 that adds the outputs A and B from the decoder D1, the phase-shift circuit I0 that changes the phase of the added signal, the binary quantizing circuit C0 that binarizes the phase-shifted signal, the subtraction circuit G0 that subtracts the output signals A and B from the decoder D1 to generate a reference signal, and a lock-in amplifier P0 that phase-detects and converts the subtracted signal to a voltage signal by using the reference signal, and indicates the interconnections between these elements.

FIG. 18 shows the wiring between the interference buffers U11, U12, U13, U14, U15, U16, U17, and U18 which convert the impedance of the signals from the terminals U1 through U8, the resistances U21, U22, U23, U24, U25, U26, U27, and U28 which perform addition and adjustment, the operational amplifiers U19 and U20 which perform differential amplification, the resistances U31 through U38, and the output terminals A and B.

In FIG. 19, the operational amplifier H1 which serves as an interference buffer, the trimmer resistor H2 and capacitor H7 which serve as a lowpass filter, and the operational amplifier H3 and resistances H4 through H6 that serve as an inverting amplifier are shown as implementation of the oscillator circuit H0 of FIG. 17.

In FIG. 19, the trimmer resistor LA1 and the capacitor LA2 are shown as an implementation of the lowpass filter LA of FIG. 17.

In FIG. 19, the trimmer resistor LB1 and the capacitor LB2 are shown as an implementation of the lowpass filter LB of FIG. 17.

In FIG. 19, the operational amplifiers K1 and K2 and the resistances K3 and K4, which serve as an interference buffer, are shown as an implementation of the terminals A and B and the adding circuit K0 of FIG. 17.

In FIG. 19, the resistance I1 and the capacitor I2, which serve as a lowpass filter, are shown as an implementation of the phase-shift circuit I0 of FIG. 17.

In FIG. 19, the first comparator C1 and the second comparator C2 are shown as an implementation of the binary quantizing circuit C0 of FIG. 17.

In FIG. 19, the interference buffers G1 and G2, the operational amplifier G3 and resistances G4 through G7 that serve as the first differential operational amplifier, and the operational amplifier G8 and resistances G9 through G12 that serve as the second differential operational amplifier are shown as an implementation of the subtraction circuit G0 of FIG. 17.

In FIG. 19, the operational amplifier P1, the capacitors P2 and P3, and resistances P4 through P7 that serve as the first bandpass filter, the operational amplifier P8, the capacitors P9 and P10, and the resistances P11 through P14 that serve as the second bandpass filter, the first analog switch P15, the second analog switch P16, and the resistance P17 and the capacitance P18 that serve as a lowpass filter are shown as an implementation of the lock-in amplifier of FIG. 17.

FIG. 6 shows the configuration of a four-beam tuning fork vibrating gyro 10 as a gyro element sealed in a cylindrical tube. The base 16 is made of an insulating material such as ceramic, with the printed wiring board adhered to the top surface thereof. The four-beam tuning fork vibrating gyro 10 is fixed by adhesion to the printed wiring board 22.

The base 16 to which the four-beam tuning fork 10 is fixed is pressed into a metallic cap 17, and the base 16 and metal cap 17 are sealed, thereby maintaining the internal environment within which the four-beam tuning fork vibrating gyro 10 exists.

This internal environment can be, for example, an atmosphere of an inert gas such as nitrogen, and the pressure thereof can be adjusted with consideration given to the vibration characteristics of the four-beam tuning fork vibrating gyro 10 as a resonator, that is, with consideration given to the Q value and resonance impedance value that would facilitate use as a vibrating gyro.

The electrodes of the four-beam tuning fork vibrating gyro 10 are connected to the leads 18, 19, 20, and 21, which are hermetically sealed, via the base 16. The leads 18, 19, 20, and 21 are connected to the oscillator circuit H0, the adding circuit K0 and subtraction circuit G0 that are shown in FIG. 2, or to the oscillator circuit H0 and lock-in amplifier P0 that are shown in FIG. 17.

Next, the operation of the vibrating gyro will be described, with reference being made to FIG. 2, FIG. 3, FIG. 4, FIG. 5, FIG. 7, FIG. 8, FIG. 9, FIG. 10, FIG. 11, FIG. 12, FIG. 14, FIG. 15, FIG. 16, FIG. 18, FIG. 19, and FIG. 20.

In FIG. 2, if a positive voltage is applied from the oscillator circuit H0 to electrode 27 so that an electrical field is developed from electrode 27 to electrode 27 of the second beam 12, because of the geometrical positioning relationship, the X-direction components of the electrical field that develops at each of these electrodes exists locally in the upper-left corning of the second beam 12.

Stated in different terms, the C-direction component of the electrical field that is generated within the second beam 12 by the electrode 27 and the electrode 28, in the coordinate axis system which is shown in FIG. 2, is smaller in the C direction than in the neutral line direction 40, and is concentrated in a large region in the Z' direction.

In quartz, if an electrical field exists in the X direction, the piezo-electric characteristics are manifested as expansion and contraction in the Y' direction.

If expansion and contraction in the Y' direction occur with the X-direction component of the electrical field that is generated within the second beam 12 by the electrode 27 and the electrode 28, the second beam 12 exhibits bending displacement in an inclined direction, with X positive and Z' negative.

As a result of the voltage that is applied to the electrode 27 by the oscillator circuit H0, this bending displacement occurs, and there is a return of an inverted-phase voltage from the electrode 28 to the oscillator circuit H0, this causing self-excitation.

When this occurs, even if the only driven beam is the second beam 12, the vibration of the second beam 12 is transmitted through the base part 15 so that the first beam 11, the third beam 13, and the fourth beam 14 automatically vibrate, this resulting in all of the beams exhibiting bending vibration in the X-axis and Z'-axis directions.

In FIG. 2, not only does the oscillator circuit H0 apply a vibration stimulus to the second beam 12, but it also excites the first beam 11 which displaces in the opposite phase, thereby forming an electromechanical vibrating system.

The existence of this mechanical bending vibration simultaneously in the X-axis direction and the Z'-axis direction is not possible to verify as a characteristic vibration by means of finite element analysis of the shape of the four-beam tuning fork vibrating gyro. In theory, the first beam 11 and second beam 12 (for which there exists a characteristic value) are displaced as a tuning fork within the Y'-Z plane. The third beam 13 and the fourth beam 14 are displaced as a tuning fork by a first bending vibration within the Y'-X plane in a phase that is inverted with respect to the vibration of the first beam 11 and the second beam 12. The third beam 13 and the first beam 11 are displaced by a second synthesized bending vibration as a tuning fork in the Y'-Z' plan in a phase that is inverted with respect to the vibration of the fourth beam 14 and the second beam 12.

Figure 7:
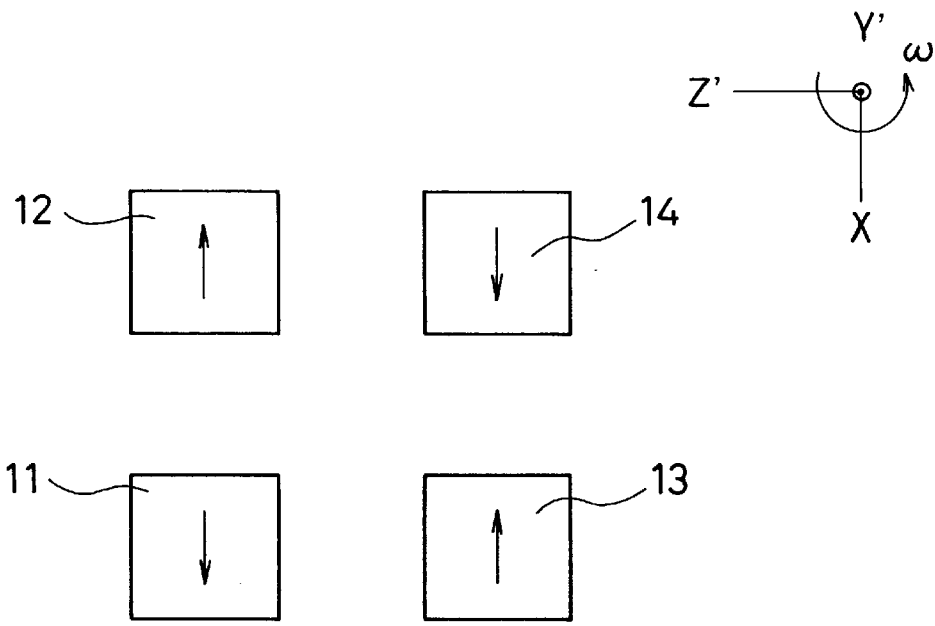
FIG. 7 is a drawing which illustrates the operation of a four-beam tuning fork vibrating gyro that is an embodiment of the present invention, and which schematically shows the cross-sections of the beams as seen from the ends thereof.

FIG. 7 shows a schematic representation of the first bending vibration. With the first bending vibration, the first beam 11, the second beam 12, the third beam 13, and the fourth beam 14 of the four-beam tuning fork vibrating gyro 10 exhibit bending vibration within the X-Y plane, the instantaneous displacement thereof being indicated by the arrows in this drawing.

Figure 8:
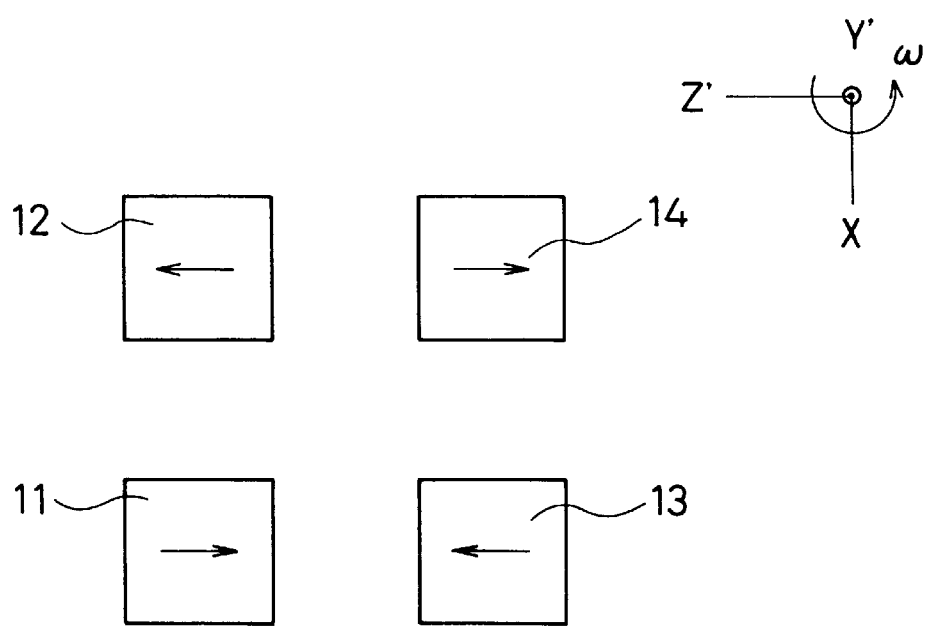
FIG. 8 is a drawing which illustrates the operation of a four-beam tuning fork vibrating gyro that is an embodiment of the present invention, and which schematically shows the cross-sections of the beams as seen from the ends thereof.

FIG. 8 shows a schematic representation of the second bending vibration. With the second bending vibration, the first beam 11, the second beam 12, the third beam 13, and the fourth beam 14 of the four-beam tuning fork vibrating gyro 10 exhibit bending vibration within the Y-Z plane.

In this case as well, the instantaneous displacement directions thereof are indicated by arrows.

The first bending vibration which is shown in FIG. 7 and the second bending vibration which is shown in FIG. 8 were verified to exist as resonant frequencies in an elastic body by means of verification with a prototype.

That is, in the first bending vibration all the beams vibrate in the X direction, the first beam 11 and the second beam 12 vibrate as a normal tuning fork, simultaneously with which the third beam 13 and the fourth beam 14 vibrate as a tuning fork in a phase that is inverted with respect to the vibration exhibited by the first beam 11 and the second beam 12.

In the second bending vibration, all beams vibrate in the Z direction, the first beam 11 and the third beam 13 vibrate as a normal tuning fork, simultaneously with which the second beam 12 and the fourth beam 14 vibrate as a tuning fork in a phase that is inverted with respect to the vibration exhibited by the first beam 11 and the third beam 13.

These vibrations are characterized by balance between the four beams and, because the base part 15 is a node and is exhibiting almost no vibration, if the bottom surface of the four-beam tuning fork vibrating gyro 10 is supported, there is almost no influence on the vibration condition by the support method.

Figure 9:
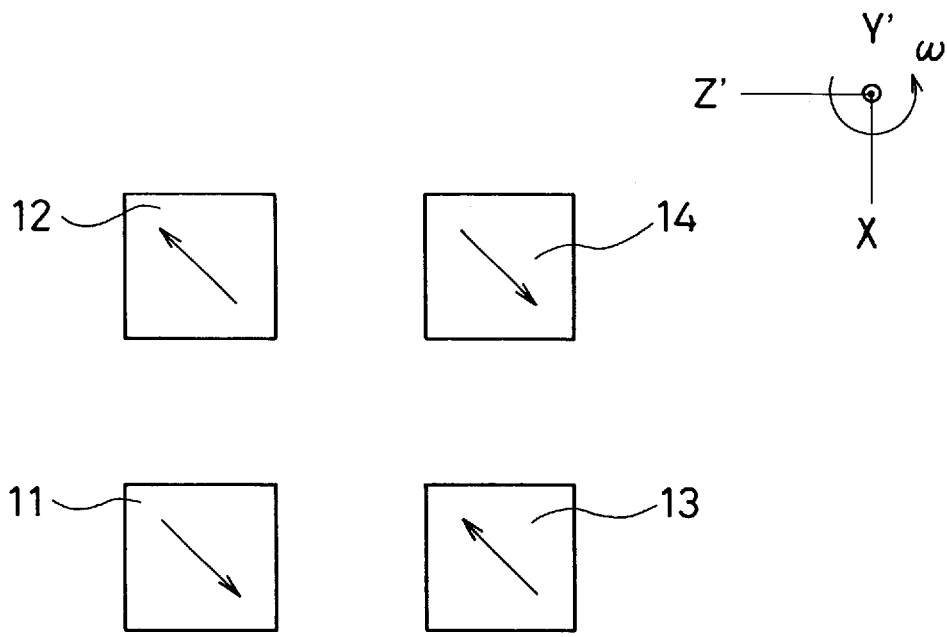
FIG. 9 is a drawing which illustrates the operation of a four-beam tuning fork vibrating gyro that is an embodiment of the present invention, and which schematically shows the cross-sections of the beams as seen from the ends thereof.

FIG. 9 shows the condition of bending vibration in a four-beam tuning fork vibrating gyro 10 for the case in which both the first bending vibration and the second bending vibration exist simultaneously.

In the circuit configuration of FIG. 2, the oscillator circuit H0 simultaneously causes the first bending vibration and the second bending vibration.

The mechanical characteristic vibration frequency of the first bending vibration, f1, and the mechanical characteristic vibration frequency of the second bending vibration, f2, are different, but when the first bending vibration and the second bending vibration are caused simultaneously, a single electromechanical system is formed, this having a frequency f. This shall be called the third bending vibration.

FIG. 9 shows the third bending vibration for the case in which the phases of the first bending vibration and the second bending vibration coincide.

Figure 10:
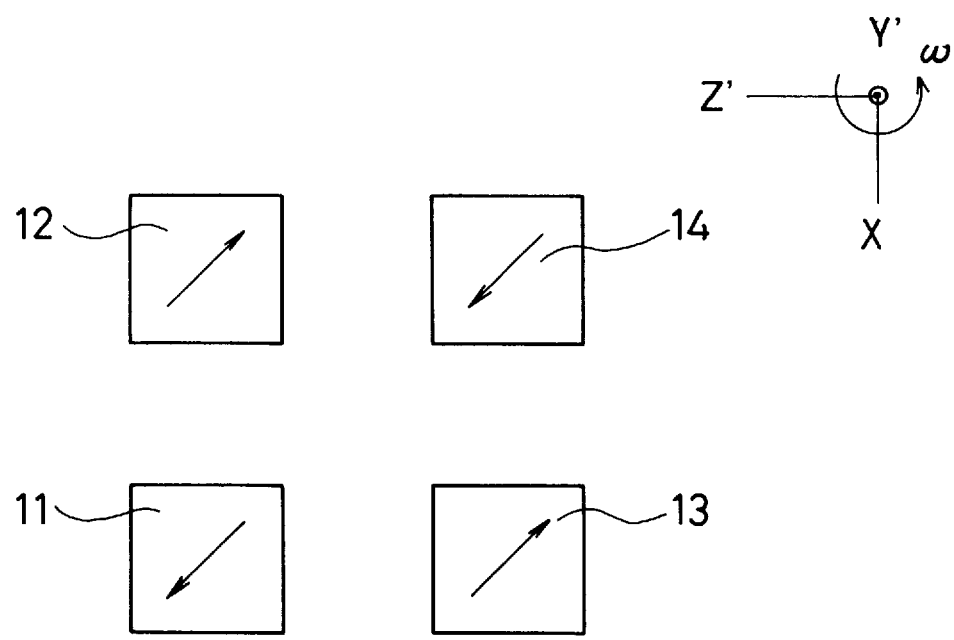
FIG. 10 is a drawing which illustrates the operation of a four-beam tuning fork vibrating gyro that is an embodiment of the present invention, and which schematically shows the cross-sections of the beams as seen from the ends thereof.

When the third bending vibration is generated, the four-beam tuning fork vibrating gyro 10 rotates about the Y axis at an angular velocity of ω, under which condition the beams of the tuning fork receive a Coriolis force in a direction which is perpendicular to the direction of displacement thereof, this Coriolis force causing the fourth bending vibration that is shown in FIG. 10.

Although the fourth bending vibration can be treated as being synthesized from the first bending vibration and the second bending vibration, the same as the third bending vibration, it is different from the third bending vibration, in that the phase of the second bending vibration is 180 degrees different from the phase of the first bending vibration.

The properties of the third bending vibration and the fourth bending vibration are exactly the same, and the fourth bending vibration is excited by the third bending vibration with the maximum efficiency, making it possible to obtain a fourth bending vibration with an extremely large amplitude.

Because a Coriolis force is an inertial force, a large force acts at a position at which the velocity is high.

This indicates that in the operation of the vibrating beams, the position of maximum velocity, which is farthest away from the position beam is at which the bent, is the position in which the maximum Coriolis force is acting.

Therefore, the fourth bending vibration that is generated by the Coriolis force that is caused by the third bending vibration is a vibration having a phase that is 90 degrees different than that of the third bending vibration.

Figure 11:
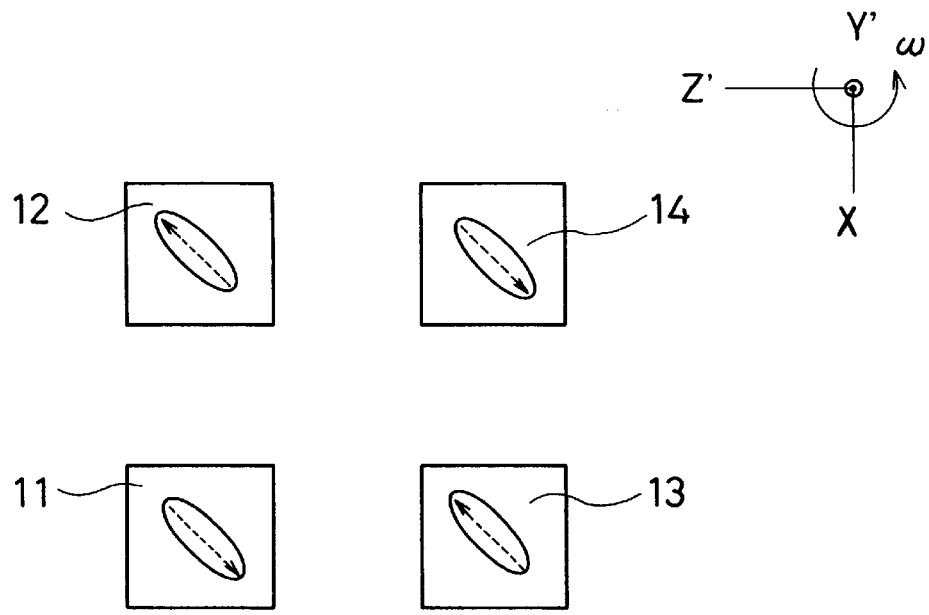
FIG. 11 is a drawing which illustrates the operation of a four-beam tuning fork vibrating gyro that is an embodiment of the present invention, and which schematically shows the cross-sections of the beams as seen from the ends thereof.

Because of this, the vibration condition that is synthesized from the third bending vibration which is shown in FIG. 9 and the fourth bending vibration caused by the Coriolis force which is shown in FIG. 10, is one in which each of the beams describes an ellipse, as shown in FIG. 11.

Let us consider in a bit more detail the third bending vibration with the configuration which is shown FIG. 2.

In the electromechanical system formed by the four-beam tuning fork vibrating gyro 10, the frequencies of the first bending vibration and the second bending vibration are caused to coincide, and a third bending vibration having a frequency f, which is a frequency value that is close to the lower of frequencies f1 and f2.

In this case, the higher of the frequencies f1 and f2 is distant from the mechanical characteristic vibration frequency. This is because, in general, in a four-beam tuning fork vibrating gyro 10 which is cut from a crystal in the directions of the X axis, the Y' axis and the Z' axis, the first bending vibration and second bending vibration resonant frequencies as an elastic resonator do not coincide in the case in which there is symmetry in the X and Z' directions in the cross-sectional shape which is perpendicular to the first beam 11, the second beam 12, the third beam 13, the fourth beam 14, and the base part 15 Y' direction.

Under these conditions, efforts are made to bring the first bending vibration resonant frequency and the second bending vibration close together.

Because the bending vibration resonant frequency of a bar-shaped resonator is proportional to the width thereof in the bending direction, the cross-section of the four-beam tuning fork vibrating gyro 10 in the direction that is perpendicular to the Y' axis is made not square but rather made rectangular with the thickness in the Z' direction reduced by approximately 0.5% with respect to the thickness in the X direction.

By means of this deformation, the second bending vibration resonant frequency is made to nearly coincide with the first bending vibration resonant frequency.

However, in the case of mass production, the machining precision of wire saws and dicing saws generally used in machining quartz is on the order of 6 μm, so that if the width of each beam of a four-beam tuning fork vibrating gyro 10 were to be 300 μm, 1% or so would be the limit of machining accuracy.

If adjustment to greater accuracy is required, because the resonant frequency of a bar-shaped resonator is inversely proportional to the square of the length of the bar, machining is done so that the beam length L1 as seen from the Z' direction as shown in FIG. 2 is made to differ from the length of the beam as seen from the X direction, by making the depths of each base point differ.

By performing further precise machining of this part locally, it is possible to get a more precise matching between the first bending vibration resonant frequency and the second bending vibration resonant frequency.

In the case of using an anisotropic crystal in a vibrating gyro, there is another problem that must be solved. In an anisotropic crystal, while clean X-direction bending vibration is obtained, regardless of the cut angle, which establishes the Y' and Z' directions as rotated from the Y and the Z axes, because Z'-direction bending vibration is influenced by the overall vibration mode, including that of the base part, with a cut angle that is generally established to obtain good temperature characteristics, clean vibration is not obtained.

This effect manifests itself, in the case, for example, of Z-direction excitation in a conventional two-beam tuning fork, by the amplitude in one beam being large and the amplitude in the other beam being small, or in prominent vibration at the base part.

In a vibrating gyro which detects vibration that is perpendicular to the excitation direction, because it is necessary to handle vibrations in both the X direction and the Z' direction, as long as an anisotropic crystal such as quartz, lithium tantalate or lithium niobate or the like such as in this embodiment is used, it is not possible to avoid this influence, regardless of what shape is used for the tuning fork.

Even in a four-beam tuning fork vibrating gyro 10 of this embodiment of the present invention, there is the effect that the vibration of the four beams will be mismatched, and that the base part will vibrate.

In this embodiment, rather than using the generally used cut angle, in the case of quartz being used as the anisotropic crystal, the cut angle of −17±2 degrees was used, meaning that the angle of rotation from the Z axis in the direction of the Y axis was 17±2 degrees.

In the case of using lithium tantalate as the anisotropic crystal, a cut angle of −12±2 degrees was used, meaning that the that the angle of rotation from the Z axis in the direction of the Y axis was −12±2 degrees.

In the case of using lithium niobate as the anisotropic crystal, a cut angle of −15±2 degrees was used, meaning that the that the angle of rotation from the Z axis in the direction of the Y axis was 15±2 degrees.

These cut angles are the cut angles at which the vibration will theoretically be expected to be simple vibration, and a test sample was used to verify that the vibrations of each of the beams of the four-beam tuning fork vibrating gyro 10 were almost the same, and that there was almost no vibration of the base part.

Additionally, with respect to the above-noted cut angles, for the purpose of making the first bending vibration resonant frequency and the second bending vibration resonant frequency the same, the ratio of beam lengths in the Z' direction and X direction was made 0.9946±0.02 for the case of a cut angle of −17±2 degrees for quarts, 0.9952±0.02 for the case of a cut angle of −12±2 for lithium tantalate, and 0.9965±0.02 for the case of a cut angle of −15±2 for lithium niobate.

When fabricating the four-beam tuning fork vibrating gyro 10, the cut angle is made within 2 degrees about the center of the above-noted angle, and above ratio of Z'-direction length to X-direction length is used as the target value, thereby enabling avoidance of disturbance to the vibration in the Z' axis direction.

In the case in which it is possible to achieve the above-noted cut angle and ratio of Z'-direction beam length to X-direction beam length, in the condition in which Coriolis force does not act, the third bending vibration is linear vibration in a direction of 45 degrees as shown in FIG. 9.

If the Coriolis force which is shown in FIG. 10 acts, the major axis shown in FIG. 11 becomes an elliptical path in the 45-degree direction, and the Coriolis force can be observed only as a change in the phase between the first bending vibration and the second bending vibration.

Figure 12:
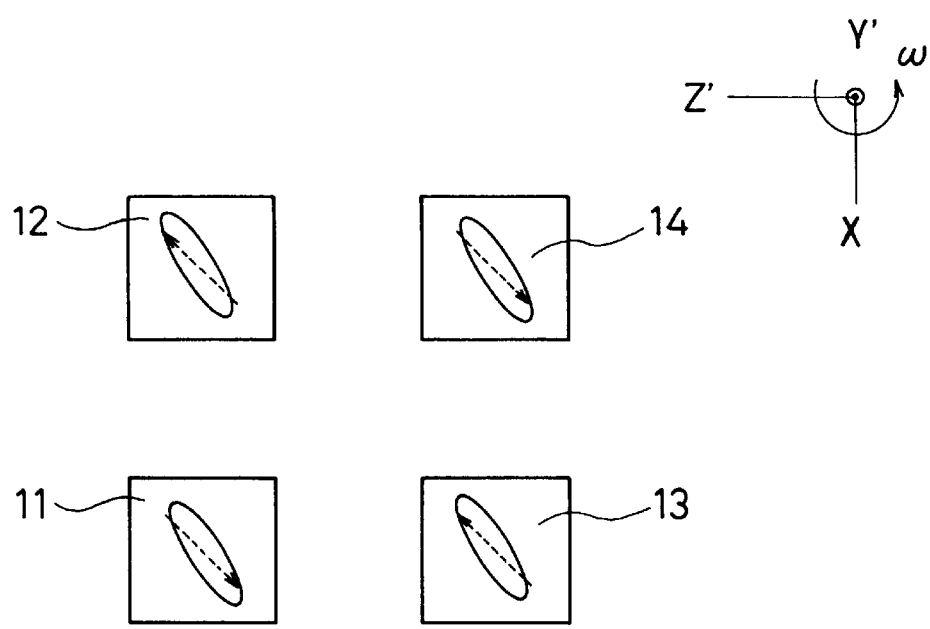
FIG. 12 is a drawing which illustrates the operation of a four-beam tuning fork vibrating gyro that is an embodiment of the present invention, and which schematically shows the cross-sections of the beams as seen from the ends thereof.
Figure 13:
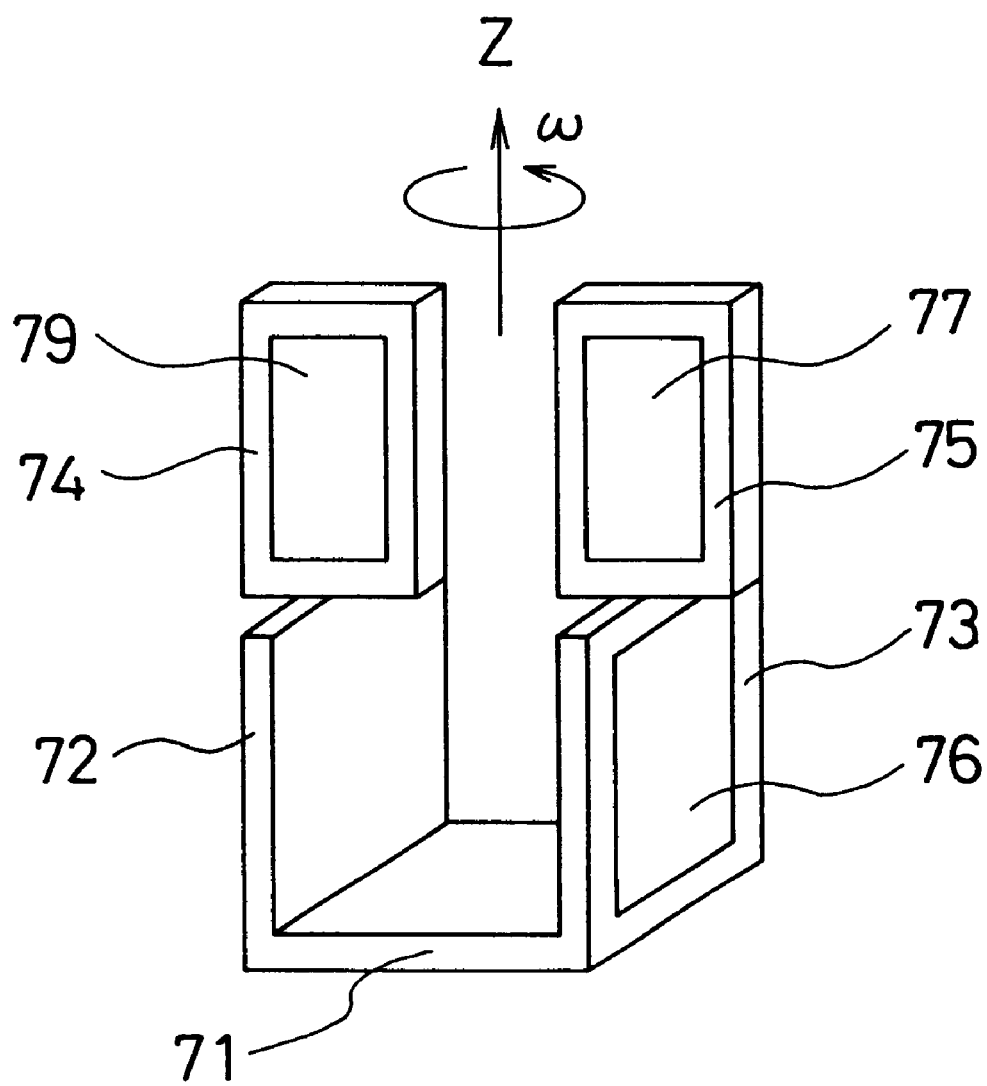
FIG. 13 is a perspective view which shows a tuning fork type vibrating gyro in the past.

However, while the main cause is accuracy in machining the tuning fork, in the case in which there are actually other causes such as non-uniformity in the mass and characteristics of the electrodes, even in the case in which a Coriolis force is not acting, the amplitudes and phases of the first bending vibration and the second bending vibration will not coincide, and the third bending vibration will generally, as shown in FIG. 12, will be an elliptical path that will be inclined from the 45-degree direction.

Even if the four-beam tuning fork vibrating gyro 10 is not rotating, there is a phase difference, and when it is rotating the further influence of the amplitude difference causes the inclination of the elliptical major axis.

That is, the amplitude difference between the first bending vibration and the second bending vibration are further changed in a complex manner under the influence of the Coriolis force.

In this embodiment of the present invention, the lowpass filter LA and the lowpass filter LB which are shown in FIG. 2 are used to change the amplitude and phase of the vibration stimulus from the oscillator circuit H0, so that with no Coriolis force acting the first bending vibration and the second bending vibration are made to coincide and the phase difference between them is eliminated, so that it is possible to obtain a linear third bending vibration such as is shown in FIG. 9.

By applying part of the output of the oscillator circuit H0 to the electrodes 25 and 29, lowpass filters LA and LB change the electric field distribution within the first beam 11 and the second beam 12, thereby bringing about these effects.

The lowpass filters LA and LB have mutually opposite effects with regard to the third bending vibration, meaning that while they make the second bending vibration either stronger or weaker with respect to the first bending vibration, and if it is desired to have opposite effects with respect to the first beam 11 and the second beam 12, in FIG. 2 the lowpass filter LA is connected not to the electrode 25, but rather to the electrode 26, and the lowpass filter LB is connected not to the electrode 29, but rather to the electrode 30.

If adjustment is performed and the linear third bending vibration shown in FIG. 9 is obtained, the Coriolis force manifests itself only as a phase difference between the first bending vibration and the second bending vibration, and it is possible to detect the Coriolis force using a simple detection circuit to be described later.

In actuality the Coriolis force effect is also accompanied by a change of the third bending vibration to an ellipse under the influence of the Coriolis force and a further change of the amplitude in the direction of the major axis of this ellipse, although these do not need to be used in detection.

As shown in FIG. 4, the lowpass filters LA and LB are implemented by the resistances LA1 and LB1 and the capacitors LA2 and LB2.

By avoiding the same values of capacitance for the capacitors LA2 and LB2, it is possible to separate the adjustment of phase from the adjustment of amplitude.

The overall change in oscillator circuit phase caused by a change in the phase can be absorbed by changing the constants in a separate lowpass filter used for prior overall phase adjustment of the oscillator circuit H0, this being implemented by the trimmer resistor H1 and the capacitor H7 as also shown in FIG. 4.

In this manner, because it is possible to perform electrical adjustment of the third bending vibration, it might appear that mechanical resonant frequency adjustment is not important.

However, if the respective mechanical resonant frequencies are too distant from one another, if the first bending vibration and second bending vibration are caused simultaneously and the third bending vibration is generated, f will be greatly distant from the higher of frequencies f1 and f2, and the bending vibration that has a resonant frequency that is the higher of the frequencies will be merely forced vibration, so that the third bending vibration no longer truly males use of the phenomenon of resonance, and making it necessary to apply a large amount of vibration stimulus energy for the purpose of maintaining sufficient amplitude.

In such non-resonance cases, the fourth bending vibration which is generated by Coriolis force is also extremely attenuated, and the large vibration stimulus of the oscillator circuit H0 also has the effect of attenuating the fourth bending vibration, making it impossible to obtain a sufficient output, so that it is important to achieve proximity to the mechanical resonant frequency beforehand.

FIG. 3 shows the decoder D0 which indicates a method of wiring to extract only the fourth bending vibration output from each of the beams of the four-beam tuning fork vibrating gyro 10.

Because the fourth bending vibration is a vibration that is perpendicular to the third bending vibration, it is possible to extract the fourth bending vibration directly from an electrode that is positioned in mirror symmetry to the electrode that is used to excite the third bending vibration.

At the third beam 13, electrode U1 outputs a voltage that is generated as a result of the electrical field that is generated as a result of the fourth bending vibration, and electrode U2 outputs a voltage having a phase that is inverted with respect to the electrode U1.

At the fourth beam 14, the electrode U5 outputs a voltage that is generated as a results of the electric field that is generated as a result of the fourth bending vibration, and electrode U6 outputs a voltage having a phase that is inverted with respect to the phase of the electrode U5 output.

Because, as shown in FIG. 10, the third beam 13 and the fourth beam 14 are vibrating in mutually opposite phases, the output of the electrode U1 and the output of the electrode U5 are in mutually opposite phase, and the output of the electrode U2 and the output of the electrode U6 are in mutually opposite phase.

Therefore, by adding the output of the electrode U1 and the output of the electrode U6 and taking this sum as the terminal UD+ output, and by adding the output of the electrode U2 and the output of the electrode U5 and taking this sum as the terminal UD− output, it is possible to simultaneously detect the fourth bending vibrations of the third beam 13 and the fourth beam 14 from the terminal UD+ and the terminal UD− output.

In doing this, if the four-beam tuning fork vibrating gyro 10 is subjected to external shock or vibration, the third beam 13 and fourth beam 14 will bend in the same direction.

According to the above-noted calculation method, the outputs in the case in which the third beam 13 and the fourth beam 14 bend in the same direction cancel each other out, so that the influence of the externally applied shock or vibration is virtually absent from the terminal UD+ and terminal UD− outputs.

The reference signal required for the lock-in amplifier which is shown in FIG. 2 is extracted from the third bending vibration.

Because the fourth bending vibration itself is a minute signal that is generated in proportion to the Coriolis force, it is not suitable for use in the phase detection in the lock-in amplifier.

However, the third bending vibration is a signal that has not only an accurate 90 degree phase difference with respect to the fourth bending vibration but also a stable amplitude. The decoder D0 indicates the method of wiring used to extract from each of the electrodes of the four-beam tuning fork vibrating gyro 10 only the third bending vibration output.

In FIG. 2, the first beam 11 and the second beam 12 are used to excite the third bending vibration.

It is obvious that it is possible to detect the third bending vibration from an electrode used to excite the third bending vibration.

At a different beam as well it is possible to directly extract the third bending vibration from an electrode that is positioned at a symmetrical position about the center line with respect to each of the beams.

At the third beam 13 the electrode U3 outputs a voltage that is generated as a result of the electrical field generated as a result of the third bending vibration, and the electrode U4 outputs a voltage having a phase that is inverted with respect to the phase of the output of the electrode U3.

At the fourth beam 14 the electrode U7 outputs a voltage that is generated as a result of the electrical field generated as a result of the third bending vibration, and the electrode U8 outputs a voltage having a phase that is inverted with respect to the phase of the output of the electrode U7.

Because, as shown in FIG. 10, the vibration of the third beam 13 and the fourth beam 14 are in mutually opposite phases, the output from the electrode U3 and the output from the electrode U8 are also in mutually opposite phases, as are the outputs from the electrode U4 and the electrode U7.

Therefore, by adding the output of the electrode U3 and the output of the electrode U8 and taking this sum as the terminal US+ output, and by adding the output of the electrode U4 and the output of the electrode U7 and taking this sum as the terminal US− output, it is possible to simultaneously detect the fourth bending vibrations of the third beam 13 and the fourth beam 14 from the terminal US+ and the terminal US− output.

As shown in FIG. 2, the signal UD+ and the signal UD−, which are caused only by the fourth bending vibration, are input to the subtraction circuit G0 as detection signals, and using the differential amplifiers G1 through G12 which are configured as shown in FIG. 3 so as to have a high common-mode rejection ratio, CMRR, detection signals and signals having the reverse phase thereof are generated, these being input to the lock-in amplifier P0 which is shown in FIG. 2.

Inside the lock-in amplifier P0, as shown in FIG. 3, the bandpass filters P1 through P14 are used to eliminate the DC components and the odd-ordered harmonic components from the detection signals and the signals having reversed phases thereof, the analog switches P15 and P16 are switched, and the smoothing and integrating circuits P17 and P18 are used to perform conversion to DC.

Also, as shown in FIG. 2, signal US+ and US−, which are caused only by the third bending vibration, are input to the subtraction circuit S0 as reference signals, these are subtracted by the differential amplifier circuits S1 through S5 such as shown in FIG. 4, the phases thereof are shifted by 90 degrees by the phase-shift circuits I0 and I1, the comparators C1 and C2 generate a switching signal and a signal having the reverse phase thereof, these being input to the analog switches P15 and P16.

As a result, the detection signals are full-wave detected at timing that is 90 degrees phase-shifted from the reference signal, thereby being converted to DC outputs, and further being integrated by the integration circuits P17 and P18.

In doing this, to avoid DC drift, a switching method of detection is used rather than a multiplier in performing phase detection.

In this configuration, signal components of a frequency other than the reference signal frequency, which are treated as noise, are almost completely eliminated, thereby enabling detection of the Coriolis force with an extremely high S/N ratio.

Next, the method of adjusting the third bending vibration will be described. A third bending vibration is a vibration such as shown in FIG. 9 or a vibration such as shown in FIG. 12 can be achieved with no Coriolis force being generated by minimizing the output of the above-noted lock-in amplifier.

However, in performing adjustment of the lowpass filters LA and LB which are shown in FIG. 2 or in performing mechanical adjustment, because of the lack of detailed information with regard to the phase and amplitude of the first bending vibration and the second bending vibration, the adjustment approach is indeterminate. The following is a description of the method of detecting the first bending vibration and the second bending vibration separate from the third bending vibration to perform a more optimum adjustment, along with a rigorous discussion using these signals.

The following is the configuration for performing adjustment of the ratio of the Z-direction beam length with respect to the X-direction beam length in the four-beam tuning fork vibrating gyro 10, and of performing adjustment of the phase and amplitude of the first bending vibration and the second bending vibration using the lowpass filters LA and LB, and it is not absolutely necessary to build this into a vibrating gyro according to this embodiment of the present invention.

In FIG. 17, for the purpose of detecting the X-direction vibration using, for example, the third beam 13, the terminals U1 and U4 are used to detect the X-direction electrical field, simultaneously with which the terminals U3 and U2 are used to detect the electrical field in the opposite direction of the X direction.

These electrical fields, which are in mutually opposite directions as view in the X direction on either side of the neutral line 41 of the third beam 13 reflect the bending of this beam in the X direction.

Therefore, it is possible to detect the first bending vibration by taking the difference of the sum of the terminal U2 and terminal U4 outputs and the sum of the terminal U1 and terminal U3 outputs.

FIG. 18 shows the decoder D1 used to implement this. The output of the terminal U1 and the output of the terminal U3 are added by the adding circuits U11, U13, U21, and U23, and the output of the terminal U2 and the output of the terminal U4 are added by the adding circuits U12, U14, U22, and U24, each of the added outputs being then subtracted using the differential amplifiers U19 and U31 through U34. This output will be called A.

In FIG. 17, for detection of, for example, the vibration of the fourth beam 14 in the Z' direction, the electrical field in the X direction between the case in which the terminals U5 and U8 are used and the case in which the terminals U6 and U7 are used. Looking in the Z' direction, the electrical field which exists only on one side of the neutral line 42 of the fourth beam 14 reflect the Z'-direction bending.

Therefore, it is possible to detect the second bending vibration by taking the difference of the sum of the terminal U5 and terminal U8 outputs and the sum of the terminal U6 and terminal U7 outputs.

FIG. 18 shows the decoder D1 used to implement this. The output of the terminal U5 and the output of the terminal U8 are added by the adding circuits U15, U18, U25, and U28, and the output of the terminal U6 and the output of the terminal U7 are added by the adding circuits U16, U17, U26, and U27, each of the added outputs being then subtracted using the differential amplifiers U20 and U35 through U38. This output will be called B.

The outputs A and B from the decoder D1 reflect the first bending vibration and the second bending vibration, which form the third bending vibration. Under the condition in which no Coriolis force acts, the signals A and B are monitored to ascertain their amplitudes and phases accurately, mechanical adjustment of the four-beam tuning fork vibrating gyro 10 and electrical adjustment of the lowpass filters LA and LB being used to obtain the ideal condition of the third bending vibration as shown in FIG. 3.

In the condition in which the adjustments have been completed, it is possible to detect the Coriolis force from the signal A and the signal B as well. The description of this detection process enables a better description of the operation of a vibrating gyro according to this embodiment of the present invention, and is presented below.

The fourth bending vibration, which is generated by Coriolis force, has a fifth bending vibration as a component in the X direction.

The fifth bending vibration has the effect of changing the first bending vibration. That is, signal A is synthesized from the first bending vibration and from the fifth bending vibration, which is caused by the Coriolis force. The fourth bending vibration has a sixth bending vibration as a component in the Z' direction.

The sixth bending vibration has the effect of changing the second bending vibration. That is, the signal B is synthesized from the second bending vibration and from the sixth bending vibration, which is caused by the Coriolis force.

In this embodiment of the present invention, as shown in FIG. 17, the signal A and the signal B are input to the adding circuit K0 and the subtraction circuit G0, thereby generating the signal A and signal B sum signal A+B and difference signal A−B which are used.

FIG. 14 shows the relationship between the signals A, B, A+B, and A−B for the case in which no Coriolis force acts.

In this case, signals A and B are each the first bending vibration and the second bending vibration themselves, these being adjusted by means of the lowpass filters LA and LB that are shown in FIG. 2 so that they coincide completely.

The signal A+B has an amplitude that is two times the amplitude of the signals A and B, and the signal A−B has no zero amplitude.

FIG. 15 shows the relationship between the signals A, B, A+B, and A−B for the case in which a fourth bending vibration is generated by a Coriolis force. The effect of the fourth bending vibration is to change the relative phase between the signals A and B.

The relative phase between the signals A and B changes nearly proportionally with respect to the size of the angular velocity ωa of the four-beam tuning fork vibrating gyro 10.

If the angular velocity ω advances the phase of the signal A and delays the phase of the signal B, the phase of the signal B is advanced and the phase of the signal A is delayed by an angular velocity −ω, the change in phase between the signals A and B being established by the direction of ω. Regardless of the Coriolis force, the signals A+B and A−B maintain the same phase as when there is no Coriolis force acting. The Coriolis force slightly changes the amplitude of the signal A+B and causes a very slight amplitude in the signal A−B.

FIG. 16 shows the vector relationships between the signals A, B, A+B and A−B. In this case, the signal amplitudes are represented by the vector lengths, and the signal phases are indicated by the vector rotation.

The Coriolis force effect can be detected as a change in the amplitude of the signals A+B and A−B. It should be noted here that if only the phases of signals A and B change, their amplitudes not changing, the relative phase relationship between the signals A+B and A−B will always be maintained at 90 degrees, regardless of the size of the Coriolis force.

In this embodiment of the present invention, a lock-in amplifier configuration is used in the detection of a Coriolis force having a small output, only a component having the same frequency as the reference signal being extracted from the detected signal and integrated so as to achieve a high S/N ratio, and in this case it is necessary to have a reference signal that accurate coincides in phase with the detected signal.

The signals A, B, and A+B, which have a large output even when there is no configuration, are not suited for determination of a change caused by a small Coriolis force.

In contrast to this, the signal A−B, because it has no output when there is no Coriolis force, is the most suitable signal as the detected signal, in consideration of the achievement of dynamic range, and so this is used.

As a reference signal, signals A and B are not usable, as their phases are changed by the Coriolis force, and the signal A−B signal, which has the most accurate signal has either no AC output or an unstable output when there is only a small Coriolis force or no Coriolis force acting, and so is also unusable.

However, as shown in FIG. 16, the signal A+B has a large, stable amplitude at all times and has a phase difference with respect to the signal A+B that is precisely 90 degrees. Therefore, the a signal derived by shifting the phase of the signal A+B by 90 degrees is used as the reference signal.

As shown in FIG. 17, the signals A and B are input to the subtraction circuit G0, and the differential amplifier circuits G1 through G12, which are configured as shown in FIG. 19 so as to have a high common-mode rejection ratio, are used to generate the signal A−B and the signal B−A, which has a phase that is inverted, these being input to the lock-in amplifier P0 that is shown in FIG. 17.

As shown in FIG. 19, inside the lock-in amplifier P0, the bandpass filters P1 through P14 are used to eliminate the DC components and odd-ordered harmonics from the signal A+B and the signal B−A that has the inverted phase, the analog switches P15 and P16 are switched, and the smoothing and integrating circuits P17 and P18 are used to perform conversion to DC.

As shown in FIG. 17, the signals A and B are input to the adding circuit K0, are phase shifted by 90 degrees by the phase-shift circuits I0 and I1, the comparators C1 and C2 generate a switching signal and a signal having the reverse phase thereof, these being input to the analog switches P15 and P16.

As a result, the signal A−B and is full-wave detected at timing that is 90 degrees phase-shifted from signal A+B, thereby being converted to a DC output.

In doing this, to avoid DC drift, a switching method of detection is used rather than a multiplier in performing phase detection. In this configuration, signal components of a frequency other than the reference signal frequency, which are treated as noise, are almost completely eliminated, thereby enabling detection of the Coriolis force with an extremely high S/N ratio.

Therefore, from a vibration that is fifth bending vibration and the sixth bending vibration, which are caused by the Coriolis force, overlapped onto the difference been the first bending vibration and the second bending vibration, it is possible to detect as DC only the fifth bending vibration and the sixth bending vibration that are caused by the Coriolis force. By doing this, it is possible to accurately know the value of the angular velocity ω.

The third bending vibration in the four-beam tuning fork vibrating gyro 10 according to the present invention forms a tuning fork type resonance having a large value of Q. That is, it has a very stable frequency.

By using this as a reference signal, therefore, it is possible to make the width of the frequency extraction, which is the function of the lock-in amplifier, extremely small. Stated in other terms, by virtue of the configuration of this embodiment of the present invention, it is possible to almost completely eliminate noise signals which are not caused by the angular velocity ω, and the S/N ratio is good.

As can be seen clearly from the above discussion, a vibrating gyro according to the present invention adopts a configuration that has four beams that are disposed in a square pattern of two rows and two columns with good symmetry, thereby nearly eliminating the vibration of the base part thereof, regardless of the vibration being used and, without using vibration that is influenced by the support thereof, such as extraplanar vibration in a tuning fork, and enabling good angular detection accuracy without the influence on performance from the support method.

Because it uses the same vibration mode for both stimulus and detection, it is possible because of the structure to obtain large detection signals for directions, and because the configuration is such that outputs other than Coriolis force are canceled out, it is possible to achieve a high S/N ratio. Because separate beams are used for stimulus and detection, there is almost no DC drift caused by phase skew resulting from the oscillation system.

What is claimed is:

1. A vibrating gyro comprising four beams, electrodes, and a base part, wherein said beams are made of an anisotropic crystal that exhibits elasticity and piezo-electric characteristics, said beams being oriented in a X, Y, Z space having an X-axis, a Y-axis, and a Z-axis, respectively forming an X-Y plane, an X-Z plane and a Y-Z plane therebetween, said Z-axis passing through a vertex of said anisotropic crystal, said beams having a width set along said X-axis, each of said beams extending in an upright direction from a surface of said base part, said beams having a length being parallel to a Y' axis that is formed by rotating the Y axis within the Y-Z plane with a certain angle, said beams also having a thickness being parallel to a Z' axis that is formed by rotating the Z axis within the Y-Z plane with a certain angle, said beams having electrodes that are formed on a side surface thereof, said base being made of an anisotropic crystal that exhibits elasticity, said base having a configuration of a square prism and being provided with said four beams formed integrally with said base part, said four beams being disposed in mutually parallel fashion on said base and arranged equiangularly and equidistantly with respect to a center of said base part, a bottom surface of said base being used for the support thereof, wherein self-excited oscillation is caused using said electrodes of first and second beams of said four beams, resulting in a first bending vibration and simultaneously a second bending vibration, a vibration frequency of said second bending vibration coinciding with said first bending vibration in a direction that is perpendicular to said first bending vibration, a third bending vibration being generated as a vibration that is synthesized from said first bending vibration and second bending vibration as well as, a fourth bending vibration being generated from said third bending vibration by Coriolis force caused by rotation of said vibration gyro, in a direction perpendicular to the direction of said third bending vibration, and further wherein, a voltage, resulting from a fifth bending vibration that is a component of a certain vibrating direction of said fourth bending vibration, which coincides with a vibrating direction of said first bending vibration and that is detected via said electrodes of third and fourth beams of said four beams, and a voltage, resulting from a sixth bending vibration that is a component of a certain vibrating direction of said fourth bending vibration, which coincides with a vibrating direction of said second bending vibration, that is detected by said electrodes of said third and fourth beams.

2. A vibrating gyro according to claim 1, wherein said anisotropic crystal is quartz, and wherein a rotation angle within the Y-Z plane of said crystal is −17±2 degrees, said rotation angle being rotated −17±2 degrees from the Z axis in the Y-axis direction, and wherein said four parallel beams, which are arranged equiangularly and equidistantly by with respect to a center of said base, and said base of said vibrating gyro are arranged so that a resonant frequency of a first bending vibration almost coincides with a resonant frequency of a second bending vibration by making the ratio of the width in the Z' direction to the width in the X direction 0.9946±0.02.

3. A vibrating gyro according to claim 1, wherein said anisotropic crystal is lithium niobate, and wherein a rotation angle within the Y-Z plane of said crystal is −15±2 degrees, said rotation angle being rotated 15±2 degrees from the Z axis in the Y-axis direction, and wherein said four parallel beams, which are arranged equiangularly and equidistantly with respect to a center of said base, and said base of said vibrating gyro are arranged so that a resonant frequency of said first bending vibration almost coincides with a resonant frequency of said second bending vibration by making the ratio of the width in the Z' direction to the width in the X direction being 0.9965±0.02.

4. A vibrating gyro according to claim 1, further comprising an oscillator circuit for generating a signal to induce said first bending vibration and to induce said second bending vibration.

5. A vibrating gyro according to claim 1, wherein said third beam and the fourth beams each exhibit said third bending vibration and are provided with an electrode for detecting said third bending vibration, and wherein said detecting electrode of said third beam and said detecting electrode of said fourth beam can detect the respective signals, each one of displacement directions of said signals being opposite to each other at some given instant in time, wherein said gyro further has a configuration in that both third and fourth detecting electrodes are connected to each other so as to electrically add said detected signals to each other.

6. A vibrating gyro according to claim 4, further comprising:

a first extraction electrode on a third one of said four beams that extracts a signal thereon resulting from said third bending vibration and said fourth bending vibration;

a phase-shift circuit that shifts the phase of said signal from said first extraction electrode by 90 degrees;

a binary quantizing circuit that binarizes an output of said phase-shift circuit;

a second extraction electrode on a fourth one of said four beams that extracts a signal thereon resulting from said third bending vibration and said fourth bending vibration; and a lock-in amplifier which detects said signal from said second extraction electrode by using the output of said binary quantizing circuit.

7. A vibrating gyro according to claim 4, further comprising:

first extraction electrode on a third one of said four beams that extracts a voltage thereon resulting from said second bending vibration and said fifth bending vibration;

a second extraction electrode on a fourth one of said four electrodes which extracts a voltage thereon resulting from said second bending vibration and the sixth bending vibration;

an adding circuit that adds outputs from said first and second extraction electrodes;

a phase-shift circuit that shifts the output from said adding circuit by 90 degrees;

a binary quantizing circuit that binarizes the output of said phase-shift circuit;

a third extraction electrode that extracts a voltage thereon resulting from said first bending vibration and said fifth bending vibration;

a fourth extraction electrode that extracts a voltage thereon resulting from said second bending vibration and said sixth bending vibration;

a subtraction circuit which subtracts outputs from said third and fourth extraction electrodes; and:

a lock-in amplifier which detects the output of said subtraction circuit by using the output of said binary quantizing circuit.

8. A vibrating gyro according to claim 4, further comprising a lowpass filter for adjusting the output signal of said oscillator circuit so that the amplitude and phase of said first bending vibration coincide with the amplitude and phase of said second bending vibration.

9. A vibrating gyro according to claim 1, wherein positions of said four beams are disposed on said base in a square arrangement.

10. A vibrating gyro according to claim 1, wherein said beams have a cross-sectional shape which is rectangular or circular.

11. A vibrating gyro according to claim 1, wherein said electrodes are formed by metal deposition which is applied to a side surface thereof.

12. A vibrating gyro according to claim 1, wherein the shape of said base is a rectangular prism.

13. A vibrating gyro according to claim 1, wherein said anisotropic crystal is lithium tantalate, and wherein a rotation angle within the Y-Z plane of said crystal is −12±2 degrees, said rotation angle being rotated 12±2 degrees from the Z axis in the Y-axis direction, and wherein said four parallel beams, which are arranged equiangularly and equidistantly with respect to a center of said base, and said base of said vibrating gyro are arranged so that a resonant frequency of said first bending vibration almost coincides with a resonant frequency of said second bending vibration by making the ratio of the width in the Z' direction to the width in the X direction be 0.9952±0.02.

14. A vibrating gyro according to claim 1, wherein attachment positions of said four beams are arranged equidistantly, parallely and equiangularly with respect to a center of said base, and each beam is configured so that thereof as viewed from the X direction is of a different length than a second side thereof as viewed from the Z' direction, so that a resonant frequency of a first bending vibration substantially coincides with a resonant frequency of a second bending vibration.

15. A vibrating gyro made of an anisotropic crystal, said gyro comprising:

a base; and four substantially parallel beams extending substantially normally from a same side of said base and being disposed substantially symmetrically about said base;

wherein each beam has attached thereto a plurality of electrodes, and at least one of said plurality of electrodes is a non-planar electrode attached to the beam so as to assume a non-planar conformation, and said beams being oriented in a X, Y, Z space having an X-axis, a Y-axis, and a Z-axis, respectively forming an X-Y plane, an X-Z plane and a Y-Z plane therebetween, said Z-axis passing through a vertex of said anisotropic crystal.

16. A vibrating gyro according to claim 15, wherein said beams have a cross-sectional shape which is rectangular or circular.

17. A vibrating gyro according to claim 16, wherein, if said thickness is set along the X-axis, then said width is parallel to the Z'-axis.

18. A vibrating gyro according to claim 15, wherein electrodes are formed by metal deposition which is applied to a side surface thereof.

19. A vibrating gyro according to claim 15, wherein the shape of said base is a rectangular prism.

20. A vibrating gyro according to claim 17, wherein said anisotropic crystal is lithium tantalate, and wherein a rotation angle within the Y-Z plane of said crystal is −12±2 degrees, said rotation angle being rotated 12±2 degrees from the Z axis in the Y-axis direction, and wherein said four parallel beams, which are arranged equiangulary and equidistantly with respect to a center of said base, and said base of said vibrating gyro are arranged so that a resonant frequency of said first bending vibration almost coincides with a resonant frequency of said second bending vibration by making the ratio of the width in the Z' direction to the width in the X direction be 0.9952±0.02.

21. A vibrating gyro according to claim 15, wherein attachment positions of said four beams are arranged equidistantly, parallely and equiangulary with respect to a center of said base, and each beam is configured so that thereof as viewed from the X direction is of a different length than a second side thereof as viewed from the Z' direction, so that a resonant frequency of a first bending vibration substantially coincides with a resonant frequency of a second bending vibration.

22. A vibrating gyro according to claim 15, wherein said beams are substantially rectangular in cross-section and said non-planar conformation results from said non-planar electrodes being attached to two sides of said beams.

23. A vibrating gyro according to claim 22, wherein each beam has attached there two non-planar electrodes and two planar electrodes.

24. A vibrating gyro according to claim 15, wherein said beams are formed of an anisotropic crystal.

25. A vibrating gyro according to claim 24, wherein said anisotropic crystal exhibits elasticity and piezo-electric characteristics.

26. A vibrating gyro according to claim 24, wherein said anisotropic crystal is one of quartz, lithium niobate and lithium tantalate.

27. A vibrating gyro according to claim 15, wherein said beams have a cross-sectional shape which is rectangular or circular.

28. A vibrating gyro according to claim 15, wherein said electrodes are formed by metal deposition which is applied to a side surface thereof.

29. A vibrating gyro according to claim 15, wherein the shape of said base is a rectangular prism.

30. A vibrating gyro according to claim 15, wherein said anisotropic crystal is lithium tantalate, and wherein a rotation angle within the Y-Z plane of said crystal is −12±2 degrees, said rotation angle being rotated 12±2 degrees from the Z axis in the Y-axis direction, and wherein said four parallel beams, which are arranged equiangularly and equidistantly with respect to a center of said base, and said base of said vibrating gyro are arranged so that a resonant frequency of said first bending vibration almost coincides with a resonant frequency of said second bending vibration by making the ratio of the width in the Z' direction to the width in the X direction be 0.9952±0.02.

31. A vibrating gyro according to claim 15, wherein attachment positions of said four beams are arranged equidistantly, parallely and equiangularly with respect to a center of said base, and each beam is configured so that thereof as viewed from the X direction is of a different length than a second side thereof as viewed from the Z' direction, so that a resonant frequency of a first bending vibration substantially coincides with a resonant frequency of a second bending vibration.

32. A vibrating gyro comprising four beams, electrodes, and a base part, wherein said beams are made of an anisotropic crystal that exhibits elasticity and piezo-electric characteristics, said beams being oriented in a X, Y, Z space having an X-axis, a Y-axis, and a Z-axis, respectively forming an X-Y plane, an X-Z plane and a Y-Z plane therebetween, said Z-axis passing through a vertex of said anisotropic crystal, in a case of a beam having a rectangular prism shape, said beams having a width along which each of said beams extending in an upright direction from a surface of said base part, said beams having a length being parallel to a Y' axis that is formed by rotating the Y axis within the Y-Z plane with a certain angle, said beams also having a thickness being parallel to a Z' axis that is formed by rotating the Z the axis within the Y-Z plane with a certain angle, said beams having at least one electrode that is formed by metal deposition which is applied to at least one selected side surface thereof, said base being made of an anisotropic crystal that exhibits elasticity and piezo-electric characteristics, the shape of said base being that of a rectangular prism, said base and said four beams being formed together as one, said four beams being disposed in mutually parallel fashion in said base in a pattern having two rows of two beams each, the bottom surface of said base being used for the support thereof, wherein self-excited oscillation is caused using said electrodes of said first and second beams, a first bending vibration being caused to occur, a second bending vibration being generated which has a vibration frequency that coincides with said first bending vibration in a direction that is perpendicular to said first bending vibration, a third bending vibration being generated as a vibration that is synthesized from said first bending vibration and said second bending vibration, a voltage that results from a fifth bending vibration that is a component of a fourth bending vibration in the direction of said first bending vibration and in a direction that is perpendicular to said third bending vibration that is excited by a Coriolis force caused by rotation being detected via said electrodes of said third and fourth beams, and a voltage that results from a sixth bending vibration that is a component of said fourth bending vibration in the direction of said second bending vibration is detected by said electrodes of said third and fourth beams.

* * * * *